US012769899B2

(12) United States Patent
Labala

(10) Patent No.: US 12,769,899 B2
(45) Date of Patent: Oct. 20, 2026

(54) BIO-CLIMATICALLY ADAPTED ZERO-ENERGY PREFABRICATED MODULAR BUILDING AND METHODS THEREOF WITH THERMAL BRIDGE BREAKAGES

(71) Applicant: Alejandro Omar Labala, Saladillo (AR)

(72) Inventor: Alejandro Omar Labala, Saladillo (AR)

(*) Notice: Subject to any disclaimer, the term of this patent is extended or adjusted under 35 U.S.C. 154(b) by 1014 days.

(21) Appl. No.: 17/985,745

(22) Filed: Nov. 11, 2022

(65) Prior Publication Data

US 2024/0169103 A1 May 23, 2024

(51) Int. Cl.

| | |
|---|---|
| ***G06F 30/13*** | (2020.01) |
| ***E04B 1/74*** | (2006.01) |
| ***E04B 1/76*** | (2006.01) |
| ***G06F 30/12*** | (2020.01) |
| *G06F 119/08* | (2020.01) |

(52) U.S. Cl.

CPC ................ *G06F 30/13* (2020.01); *E04B 1/76* (2013.01); *G06F 30/12* (2020.01); *E04B 2001/742* (2013.01); *G06F 2119/08* (2020.01)

(58) Field of Classification Search

CPC ........... G06F 30/25; G06F 30/27; G06F 30/28

See application file for complete search history.

(56) References Cited

U.S. PATENT DOCUMENTS 948,541 A * 2/1910 Coleman ............... F25D 23/065 52/577

2,481,722 A * 9/1949 Clapp .................... H01H 81/02 337/88

(Continued)

FOREIGN PATENT DOCUMENTS

CN 208089721 U * 11/2018 .............. F16B 19/02

CN 219909416 U * 10/2023

(Continued)

OTHER PUBLICATIONS

Roppel, Patrick, Dieter Hardock and Morrison Hershfield. "Thermal Breaks and Energy Performance in High-Rise Concrete Balconies." (2013). (Year: 2013).*

*Primary Examiner* — Ryan F Pitaro

*Assistant Examiner* — Jay Michael White

(74) *Attorney, Agent, or Firm* — Mariana I. Vernieri

(57) ABSTRACT

Methods for designing a bio-climatically adapted affordable Zero-Energy prefabricated modular building such as for housing, in which a Layered disposition of Envelope elements—including Structural Insulated Panels and Thermal Bridge Breakage Capsules—in the wall, floor and roof sections, provide a highly energy-efficient Building Envelope, which together with a modular building Support Structure including Aeriated Frames, and an adequately sized renewable energy power generator system, inexpensively achieves the energetic independence of the building. The Thermal Bridge Breakage Capsules have a PVC spherical cap with a hole and a flat plaque around it and are filled with a high insulation material. When inserted at a distance "L", they improve and make more efficient the thermal transmittance of building envelopes, limiting energy losses in thermal bridges to a maximum of 12%.

1 Claim, 27 Drawing Sheets

(56) References Cited

U.S. PATENT DOCUMENTS 3,636,674 A * 1/1972 Cremer ................ G21C 11/085 52/783.17
3,802,976 A * 4/1974 McMahon ................ B63J 2/12 392/459
3,978,255 A * 8/1976 Smith, Jr. ............. E04B 1/3211 264/32
4,155,482 A * 5/1979 Swaney ............... B65D 90/022 52/406.1
4,447,796 A * 5/1984 Heinrichs ............. H01F 27/306 174/17 SF
4,514,943 A * 5/1985 Jentoft ................ E04D 13/0305 49/490.1
4,544,587 A * 10/1985 Nesbitt ................... E06B 3/285 428/920
4,597,237 A * 7/1986 Celli ......................... E04B 1/12 52/576
4,702,048 A * 10/1987 Millman ................... E04B 5/48 404/34
5,094,052 A * 3/1992 Gudmundsson .......... E04B 5/10 52/763
5,107,649 A * 4/1992 Benson ..................... E04C 2/34 52/794.1
5,157,893 A * 10/1992 Benson .................... B64G 1/22 52/789.1
5,175,975 A * 1/1993 Benson ................. F01N 3/2882 52/794.1
5,207,047 A * 5/1993 Prignitz .................... E04D 5/12 52/749.1
8,407,954 B2 * 4/2013 Keith ........................ E04B 2/44 52/831
11,698,095 B1 * 7/2023 Wigboldy ........... F16B 23/0007 411/371.2
2005/0188649 A1 * 9/2005 Hagen, Jr. ............... E04C 2/386 52/745.05
2006/0191215 A1 * 8/2006 Stark ....................... C03C 27/08 52/204.6
2007/0130840 A1 * 6/2007 Jouhannet ................. A61F 7/02 52/2.11
2008/0060294 A1 * 3/2008 Cox .......................... E04C 5/04 52/284
2009/0173029 A1 * 7/2009 Socha ....................... E04B 1/82 24/485
2009/0264437 A1 * 10/2009 Haupt ..................... A61P 25/36 514/252.19
2010/0139195 A1 * 6/2010 Tinianov ............. E06B 3/66333 52/786.13
2011/0206471 A1 * 8/2011 Doshi ..................... C04B 38/00 408/1 R
2011/0258944 A1 * 10/2011 Radoane ................. E04B 1/665 52/220.8
2012/0247063 A1 * 10/2012 Grzybowski ......... C03C 23/005 52/786.13
2013/0067838 A1 * 3/2013 Black ........................ E04B 1/80 52/794.1
2013/0074431 A1 * 3/2013 Croasdale ............ E04B 1/7604 52/309.4
2013/0212974 A1 * 8/2013 Sullivan .................. E02D 17/20 52/659
2014/0260064 A1 * 9/2014 Hensley .............. E06B 3/26301 29/515
2015/0121792 A1 * 5/2015 Spoo ....................... E04B 1/388 52/506.05
2019/0264437 A1 * 8/2019 Labala .................. E04B 1/3483
2022/0081961 A1 * 3/2022 Özden ................... E06B 3/6612

FOREIGN PATENT DOCUMENTS

CN 222667443 U * 3/2025
CN 120738639 A * 10/2025 ........... C23C 24/103
DE 102006059891 A1 * 6/2008 ............. E21D 20/02
DE 102024117843 A1 * 1/2026 .......... E04F 13/0805
EP 0097782 A2 * 1/1984 ............ H10W 40/77
EP 1083268 A2 * 3/2001 ........... E06B 3/5445
ES 2524691 T3 * 12/2014 ............. E02D 29/02
FR 2907189 A1 * 4/2008 .............. F16L 59/02
GB 254057 A * 7/1926 .............. A01J 15/06
GB 2574057 A * 11/2019 ............. B65B 31/02
KR 102682596 B1 * 7/2024 .............. F16B 33/02
SE 502499 C2 * 10/1995 .......... E04F 13/0878
WO WO-2009118149 A1 * 10/2009 ............... E04D 3/28
WO WO-2017099919 A1 * 6/2017 .......... H10P 72/7616
WO WO-2021055426 A1 * 3/2021 ........... B29C 64/255

* cited by examiner

Fig. 1
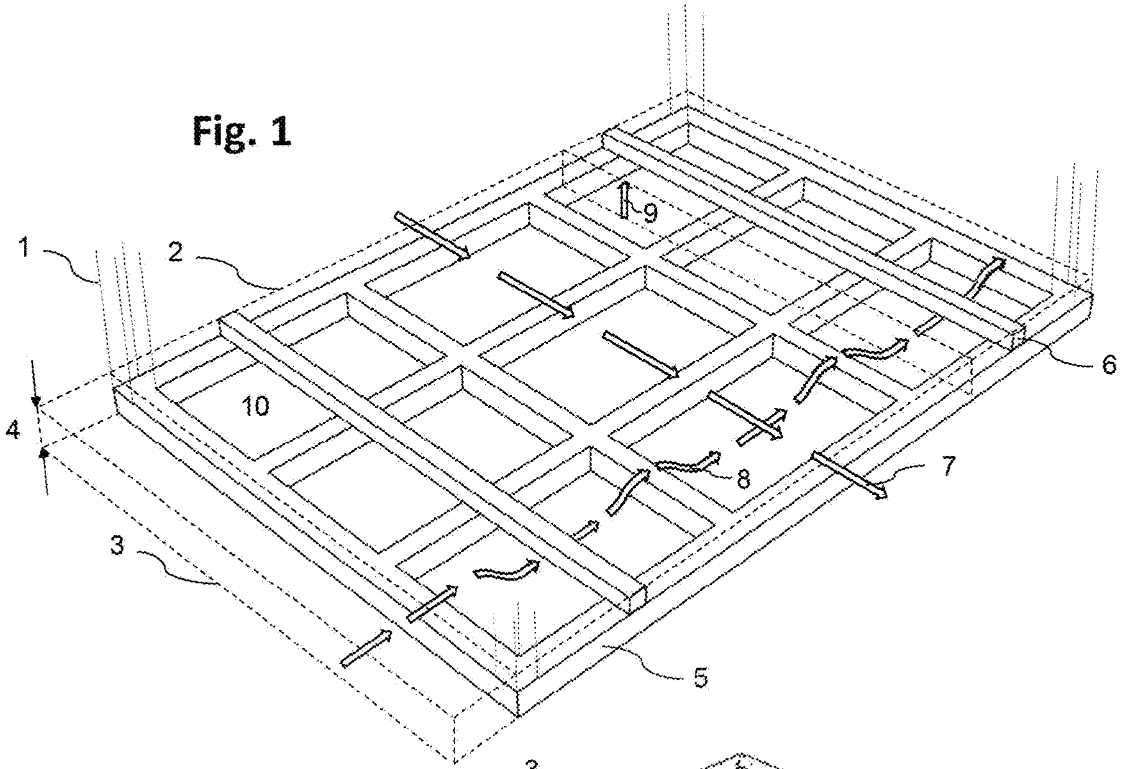
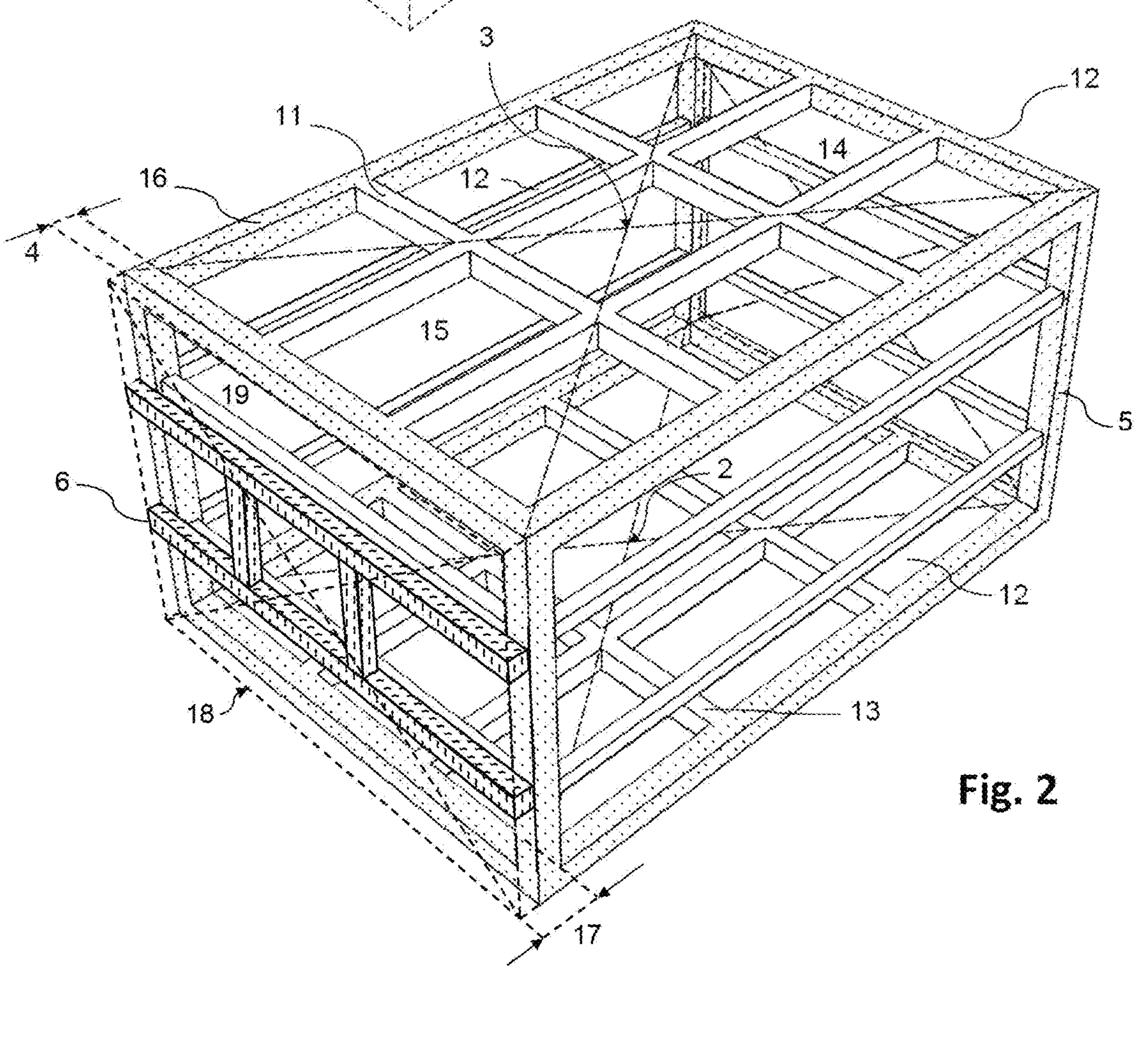
Fig. 2

Fig. 4A
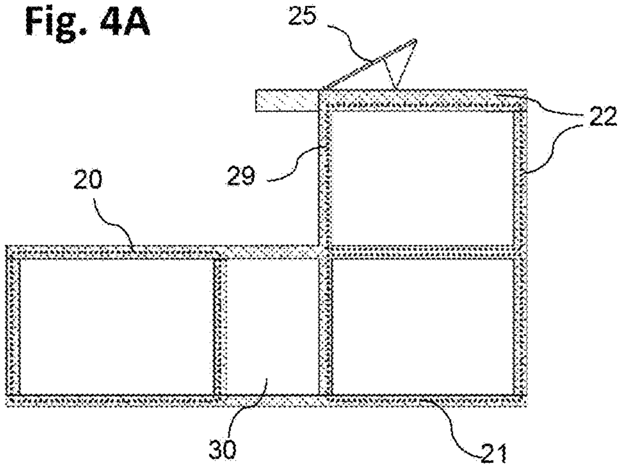
Fig. 4B
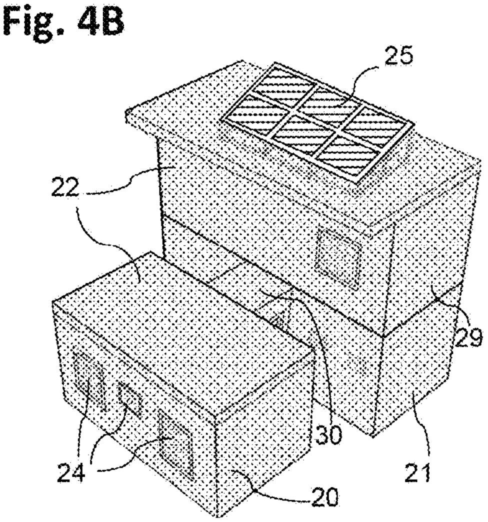
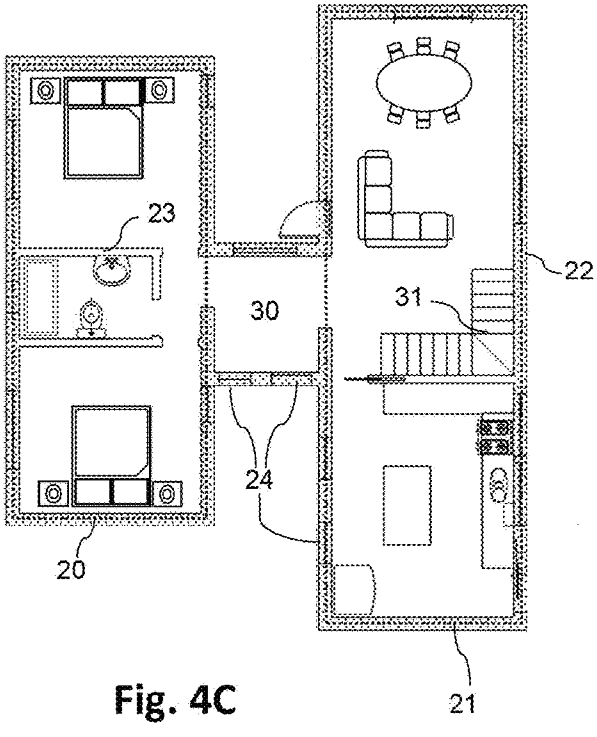
Fig. 4C
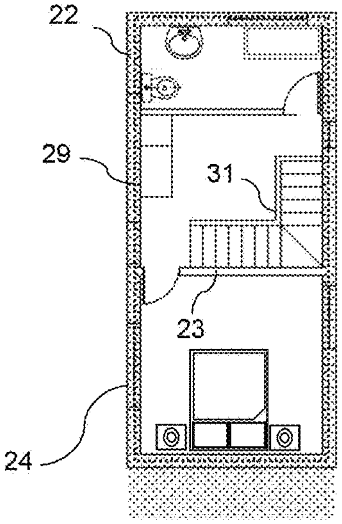
Fig. 4D

Fig. 7
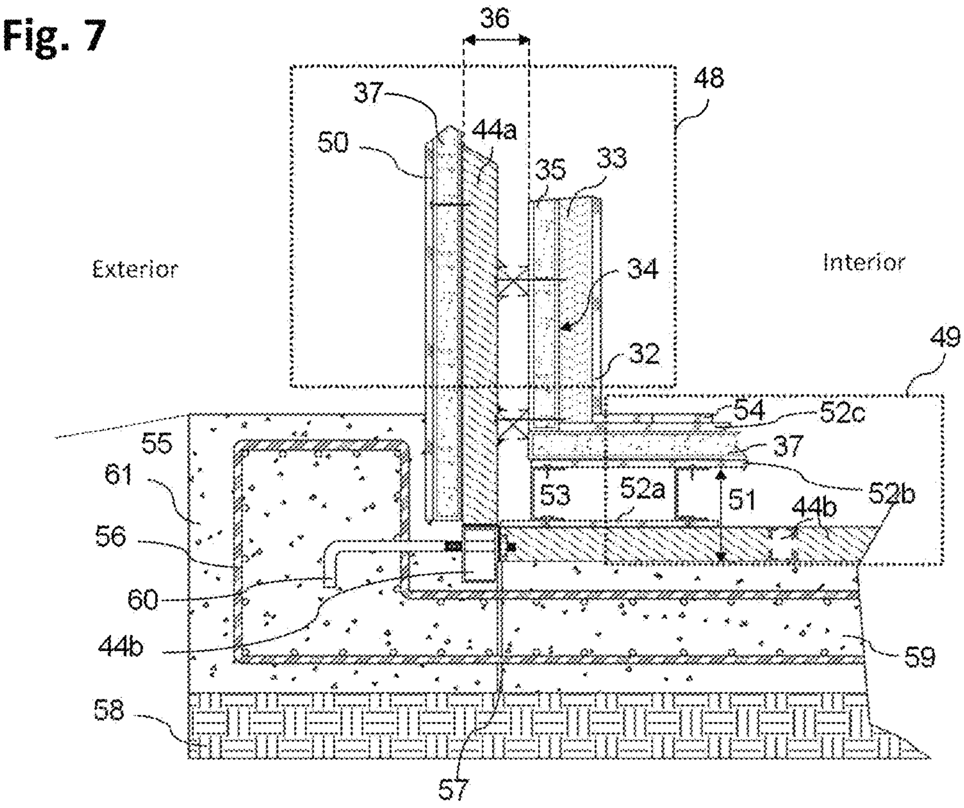
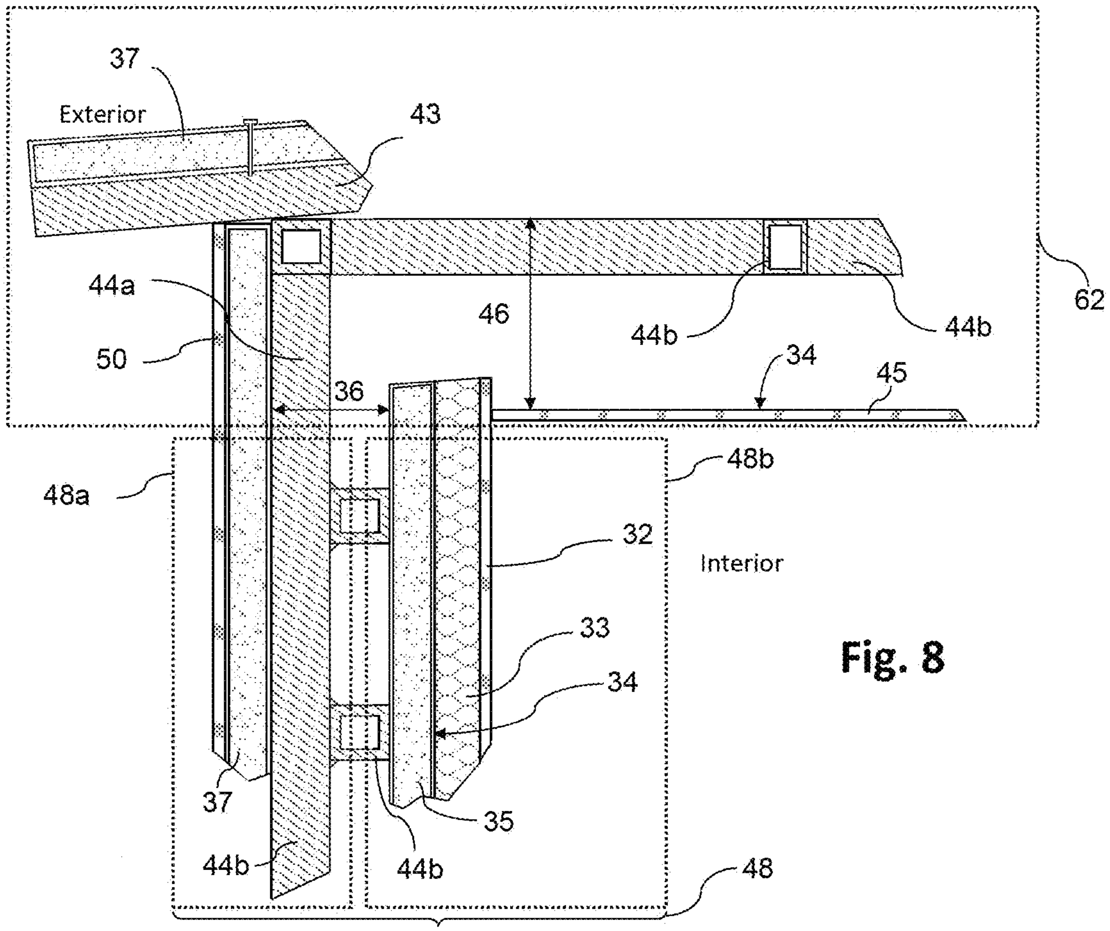
Fig. 8

TABLE 1 - CONSTANTS 80

Fig. 20A

Subtable 1: Kmax 81

81a 81b 81c 81d

| Exterior temperature | KMAX(WS) | KMAX(RS) | KMAX(FS) |
|---|---|---|---|
| (°C) | (W/m² K) | (W/m² K) | (W/m² K) |
| -15 or less | 0.138 | 0.120 | 0.100 |
| -14 | 0.138 | 0.120 | 0.100 |
| -13 | 0.144 | 0.126 | 0.105 |
| -12 | 0.150 | 0.126 | 0.105 |
| -11 | 0.150 | 0.132 | 0.110 |
| -10 | 0.156 | 0.138 | 0.115 |
| -9 | 0.162 | 0.138 | 0.115 |
| -8 | 0.168 | 0.144 | 0.120 |
| -7 | 0.174 | 0.150 | 0.125 |
| -6 | 0.180 | 0.156 | 0.130 |
| -5 | 0.186 | 0.162 | 0.135 |
| -4 | 0.192 | 0.168 | 0.140 |
| -3 | 0.198 | 0.174 | 0.145 |
| -2 | 0.210 | 0.180 | 0.150 |
| -1 | 0.216 | 0.186 | 0.155 |
| 0 | 0.228 | 0.192 | 0.160 |
| 1 | 0.228 | 0.192 | 0.160 |
| 2 | 0.228 | 0.192 | 0.160 |
| 3 | 0.228 | 0.192 | 0.160 |
| 4 | 0.228 | 0.192 | 0.160 |
| 5 | 0.228 | 0.192 | 0.160 |
| 6 | 0.228 | 0.192 | 0.160 |
| 7 | 0.228 | 0.192 | 0.160 |
| 8 | 0.228 | 0.192 | 0.160 |
| 9 | 0.228 | 0.192 | 0.160 |
| 10 | 0.228 | 0.192 | 0.160 |
| 11 | 0.228 | 0.192 | 0.160 |
| 12 | 0.228 | 0.192 | 0.160 |
| 13 | 0.228 | 0.192 | 0.160 |
| 14 | 0.228 | 0.192 | 0.160 |
| 15 | 0.228 | 0.192 | 0.160 |
| 16 | 0.228 | 0.192 | 0.160 |
| 17 | 0.228 | 0.192 | 0.160 |
| 18 | 0.228 | 0.192 | 0.160 |
| 19 | 0.300 | 0.114 | 0.095 |
| 20 | 0.300 | 0.114 | 0.095 |
| 21 | 0.300 | 0.114 | 0.095 |
| 22 | 0.300 | 0.114 | 0.095 |
| 23 | 0.270 | 0.108 | 0.090 |
| 24 | 0.270 | 0.108 | 0.090 |
| 25 | 0.270 | 0.108 | 0.090 |
| 26 | 0.270 | 0.108 | 0.090 |
| 27 | 0.270 | 0.108 | 0.090 |
| 28 | 0.270 | 0.108 | 0.090 |
| 29 | 0.270 | 0.108 | 0.090 |
| 30 | 0.270 | 0.108 | 0.090 |
| 31 | 0.270 | 0.108 | 0.090 |
| 32 or more | 0.270 | 0.108 | 0.090 |

Fig. 20B

TABLE 1 - CONSTANTS 80

Subtable 2: Superficial Resistances 82

82a 82b 82c 82d 82e 82f 82g 82h

| Layer Type | Concept | Th | λ | R | δ | Surface Area | Option |
|---|---|---|---|---|---|---|---|
| | | (m) | (W/mk) | ($m^2k/w$) | g/m h kpa | m2 | Integer |
| ESR | Exterior Superficial Resistance | n/a | n/a | 0.04 | n/a | n/a | n/a |
| ISR | Interior Superficial Resistance | n/a | n/a | 0.13 | n/a | n/a | n/a |

Subtable 3: Air Chambers 83

83a 83b 83c 83d 83e 83f 83g 83h

| Option | Envelope Section | Layer Type | Concept | Th | R | λ | δ |
|---|---|---|---|---|---|---|---|
| (Integer) | | | | (m) | ($m^2k/w$) | (W/mk) | (g/m h kpa) |
| 1 | WS | G | Air Chamber | 0.005 to 0.009 | 0.17 | 0.029 | 0.626 |
| 2 | WS | G | Air Chamber | 0.01 to 0.019 | 0.29 | 0.034 | 0.626 |
| 3 | WS | G | Air Chamber | 0.02 to 0.049 | 0.37 | 0.054 | 0.626 |
| 4 | WS | G | Air Chamber | 0.05 to 0.99 | 0.34 | 0.147 | 0.626 |
| 5 | WS | G | Air Chamber | 0.1 to 0.149 | 0.34 | 0.294 | 0.626 |
| 6 | WS | G | Air Chamber | 0.15 to 0.199 | 0.34 | 0.441 | 0.626 |
| 7 | WS | G | Air Chamber | 0.2 to 2 | 0.34 | 0.588 | 0.626 |
| 1 | RS | H | Air Chamber | 0.005 to 0.009 | 0.17 | 0.029 | 0.626 |
| 2 | RS | H | Air Chamber | 0.01 to 0.019 | 0.26 | 0.038 | 0.626 |
| 3 | RS | H | Air Chamber | 0.02 to 0.049 | 0.3 | 0.067 | 0.626 |
| 4 | RS | H | Air Chamber | 0.05 to 0.99 | 0.45 | 0.111 | 0.626 |
| 5 | RS | H | Air Chamber | 0.1 to 0.149 | 0.45 | 0.222 | 0.626 |
| 6 | RS | H | Air Chamber | 0.15 to 0.199 | 0.45 | 0.333 | 0.626 |
| 7 | RS | H | Air Chamber | 0.2 to 2 | 0.45 | 0.444 | 0.626 |
| 1 | FS | H | Air Chamber | 0.005 to 0.009 | 0.17 | 0.029 | 0.626 |
| 2 | FS | H | Air Chamber | 0.01 to 0.019 | 0.26 | 0.038 | 0.626 |
| 3 | FS | H | Air Chamber | 0.02 to 0.049 | 0.3 | 0.067 | 0.626 |
| 4 | FS | H | Air Chamber | 0.05 to 0.99 | 0.45 | 0.111 | 0.626 |
| 5 | FS | H | Air Chamber | 0.1 to 0.149 | 0.45 | 0.222 | 0.626 |
| 6 | FS | H | Air Chamber | 0.15 to 0.199 | 0.45 | 0.333 | 0.626 |
| 7 | FS | H | Air Chamber | 0.2 to 2 | 0.45 | 0.444 | 0.626 |

Fig. 21

TABLE 2 - VARIABLES 90

90a 90b 90c 90d

| Concept | Variable | Value | Unit |
|---|---|---|---|
| Max Temperature | Tmax | 20 | °C |
| Min Temperature | Tmin | -3 | °C |
| Interior Relative Humidity | IRH | 65 | % |
| Exterior Relative Humidity | ERH | 90 | % |
| Wall Section's Surface Area | S(WS) | 102 | $m^2$ |
| Roof Section's Surface Area | S(RS) | 54 | $m^2$ |
| Floor Section's Surface Area | S(FS) | 50 | $m^2$ |
| Interior Temperature Goal | ITG | 18 | °C |
| Max K desirable for Wall Section | Kmax (WS) | 0.198 | $W/m^2 K$ |
| Max K desirable for Roof Section | Kmax (RS) | 0.114 | $W/m^2 K$ |
| Max K desirable for Floor Section | Kmax (FS) | 0.095 | $W/m^2 K$ |

TABLE 3 -LAYER OPTIONS 100

Fig. 23

100a

| Gypsum Board Options (A) | | | | |
|---|---|---|---|---|
| Option (Integer) | Th (m) | λ (W/mk) | δ g/m h kpa | $ (USD/m$^2$) |
| 1 | | 0.22 | | |
| 2 | | | | |
| 3 | | | | |
| ... | | | | |
| ... | | | | |
| n-1 | | | | |
| n | | | | |

100e

| OSB Board Options (E) | | | | |
|---|---|---|---|---|
| Option (Integer) | Th (m) | λ (W/mk) | δ g/m h kpa | $ (USD/m$^2$) |
| 1 | | | | |
| 2 | | | | |
| 3 | | | | |
| ... | | | | |
| ... | | | | |
| n-1 | | | | |
| n | | | | |

100b

| Insulating Layer Options (B) | | | | |
|---|---|---|---|---|
| Option (Integer) | Th (m) | λ (W/mk) | δ g/m h kpa | $ (USD/m$^2$) |
| 1 | | 0.33 | | |
| 2 | | | | |
| 3 | | | | |
| ... | | | | |
| ... | | | | |
| n-1 | | | | |
| n | | | | |

100f

| Wood Floor Options (F) | | | | |
|---|---|---|---|---|
| Option (Integer) | Th (m) | λ (W/mk) | δ g/m h kpa | $ (USD/m$^2$) |
| 1 | | | | |
| 2 | | | | |
| 3 | | | | |
| ... | | | | |
| ... | | | | |
| n-1 | | | | |
| n | | | | |

100c

| Vapor Barreer Options (C) | | | | |
|---|---|---|---|---|
| Option (Integer) | Th (m) | λ (W/mk) | δ g/m h kpa | $ (USD/m$^2$) |
| 1 | | | | |
| 2 | | | | |
| 3 | | | | |
| ... | | | | |
| ... | | | | |
| n-1 | | | | |
| n | | | | |

100g

| Wall Air Chamber (G) | | | | |
|---|---|---|---|---|
| Option (Integer) | Th (m) | λ (W/mk) | δ g/m h kpa | $ (USD/m$^2$) |
| 1 | 0.005 | 0.029 | 0.626 | |
| 2 | 0.01 | 0.034 | 0.626 | |
| 3 | 0.02 | 0.054 | 0.626 | |
| 4 | 0.05 | 0.147 | 0.626 | |
| 5 | 0.1 | 0.294 | 0.626 | |
| 6 | 0.15 | 0.441 | 0.626 | |
| 7 | 0.2 | 0.588 | 0.626 | |

100d

| SIP (D) | | | | |
|---|---|---|---|---|
| Option (Integer) | Th (m) | λ (W/mk) | δ g/m h kpa | $ (USD/m$^2$) |
| 1 | | | | |
| 2 | | | | |
| 3 | | | | |
| ... | | | | |
| ... | | | | |
| n-1 | | | | |
| n | | | | |

100h

| Floor or Roof Air Chamber (H) | | | | |
|---|---|---|---|---|
| Option (Integer) | Th (m) | λ (W/mk) | δ g/m h kpa | $ (USD/m$^2$) |
| 1 | 0.005 | 0.029 | 0.626 | |
| 2 | 0.01 | 0.038 | 0.626 | |
| 3 | 0.02 | 0.067 | 0.626 | |
| 4 | 0.05 | 0.111 | 0.626 | |
| 5 | 0.1 | 0.222 | 0.626 | |
| 6 | 0.15 | 0.333 | 0.626 | |
| 7 | 0.2 | 0.444 | 0.626 | |

Fig. 25

TABLE 4 - METHOD 110, 111a, 110a, 110b, 110c, 110d, 110e, 110f, 110g, 110h, 110i, 110j, 110k, 110l, 110m, 110n, 110o

| Envelope Section | Layer type | Layer Number | Th | λ | R | K | t | δ | Pv | td | Δt | $ | KMC | NCC | OPTION |
|---|---|---|---|---|---|---|---|---|---|---|---|---|---|---|---|
| | | 0 | | | | | | | F4 | | | | | | |
| | (ISR, A, B C, D, E, F, G, H, ESR) | (Integer) | (m) | (W/mk) | (m2k/w) | (W/m2 K) | (°C) | (g/m h kpa) | kpa | °C | °C | USD/m² | (binary) | (binary) | (Integer) |
| Wall Section (1) | Interior Superficial Resistance (ISR) | 1 | f/Table 1 | f/Table 1 | f/Table 1 | n/a | F5 | f/Table 1 | F6 | F7 | F8 | f/Table 1 | 0 | 0 | n/a |
| | Gypsum Board (A) | 2 | f/Table 3 | f/Table 3 | f/Table 3 | n/a | F5 | f/Table 3 | F6 | F7 | F8 | f/Table 3 | 0 | 0 | 1 |
| | Glass Wool (B) | 3 | f/Table 3 | f/Table 3 | f/Table 3 | n/a | F5 | f/Table 3 | F6 | F7 | F8 | f/Table 3 | 0 | 0 | 3 |
| | Vapor Barreer Sheet (C) | 4 | f/Table 3 | f/Table 3 | f/Table 3 | n/a | F5 | f/Table 3 | F6 | F7 | F8 | f/Table 3 | 0 | 0 | 5 |
| | Polyuretane Sandwich Panel (D) | 5 | f/Table 3 | f/Table 3 | f/Table 3 | n/a | F5 | f/Table 3 | F6 | F7 | F8 | f/Table 3 | 0 | 0 | 6 |
| | Wall Air Chamber (G) | 6 | f/Table 3 | f/Table 3 | f/Table 3 | n/a | F5 | f/Table 3 | F6 | F7 | F8 | f/Table 3 | 0 | 0 | 5 |
| | Polyuretane Sandwich Panel (D) | 7 | f/Table 3 | f/Table 3 | f/Table 3 | n/a | F5 | f/Table 3 | F6 | F7 | F8 | f/Table 3 | 0 | 0 | 2 |
| | Exterior Superficial Resistance (ESR) | 8 | f/Table 1 | f/Table 1 | f/Table 1 | n/a | F5 | f/Table 1 | F6 | F7 | F8 | f/Table 1 | 0 | 0 | n/a |
| Roof section (2) | Interior Superficial Resistance (ISR) | 1 | f/Table 1 | f/Table 1 | f/Table 1 | n/a | F5 | f/Table 1 | F6 | F7 | F8 | f/Table 1 | 0 | 0 | n/a |
| | Gypsum Board (A) | 2 | f/Table 3 | f/Table 3 | f/Table 3 | n/a | F5 | f/Table 3 | F6 | F7 | F8 | f/Table 3 | 0 | 0 | 5 |
| | Vapor Barreer Sheet (C) | 3 | f/Table 3 | f/Table 3 | f/Table 3 | n/a | F5 | f/Table 3 | F6 | F7 | F8 | f/Table 3 | 0 | 0 | 2 |
| | Roof Air Chamber (H) | 4 | f/Table 3 | f/Table 3 | f/Table 3 | n/a | F5 | f/Table 3 | F6 | F7 | F8 | f/Table 3 | 0 | 0 | 3 |
| | Glass Wool (B) | 5 | f/Table 3 | f/Table 3 | f/Table 3 | n/a | F5 | f/Table 3 | F6 | F7 | F8 | f/Table 3 | 0 | 0 | 1 |
| | Polyuretane Sandwich Panel (D) | 6 | f/Table 3 | f/Table 3 | f/Table 3 | n/a | F5 | f/Table 3 | F6 | F7 | F8 | f/Table 3 | 0 | 0 | 1 |
| | Exterior Superficial Resistance (ESR) | 7 | f/Table 1 | f/Table 1 | f/Table 1 | n/a | F5 | f/Table 1 | F6 | F7 | F8 | f/Table 1 | 0 | 0 | n/a |
| Floor Section (3) | Interior Superficial Resistance (ISR) | 1 | f/Table 1 | f/Table 1 | f/Table 1 | n/a | F5 | f/Table 1 | F6 | F7 | F8 | f/Table 1 | 0 | 0 | n/a |
| | Wood Floor (F) | 2 | f/Table 3 | f/Table 3 | f/Table 3 | n/a | F5 | f/Table 3 | F6 | F7 | F8 | f/Table 3 | 0 | 0 | 4 |
| | OSB Board (E) | 3 | f/Table 3 | f/Table 3 | f/Table 3 | n/a | F5 | f/Table 3 | F6 | F7 | F8 | f/Table 3 | 0 | 0 | 5 |
| | Polyuretane Sandwich Panel (D) | 4 | f/Table 3 | f/Table 3 | f/Table 3 | n/a | F5 | f/Table 3 | F6 | F7 | F8 | f/Table 3 | 0 | 0 | 6 |
| | OSB Board (E) | 5 | f/Table 3 | f/Table 3 | f/Table 3 | n/a | F5 | f/Table 3 | F6 | F7 | F8 | f/Table 3 | 0 | 0 | 2 |
| | Exterior Superficial Resistance (ESR) | 6 | f/Table 1 | f/Table 1 | f/Table 1 | n/a | F5 | f/Table 1 | F6 | F7 | F8 | f/Table 1 | 0 | 0 | n/a |
| Totals | Wall Section Total | | | F2 | F2 | 1/R(WS) | | F2 | | | | F9 | 0 | 0 | |
| | Roof Section Total | | | F2 | F2 | 1/R(RS) | | F2 | | | | F9 | 0 | 0 | |
| | Floor Section Total | | | F2 | F2 | 1/R(FS) | | F2 | | | | F9 | 0 | 0 | |
| | | | | | Final K: | (sum) | | | | | Final Cost: | (sum) | | | |
| | | | | | Optimized: | 0 | | | | | Optimized: | 0 | | | |

111b, 111c, 111d, 111e

Fig. 29

TABLE 5 - OPTIMIZATION 120a 110a 110b 121a 121b

| Layer type | Layer Number | Layer's Constraint | Solver variable |
|---|---|---|---|
| (ISR, A, B C, D, E,F, ESR) | (Integer) | (Integer) | (binary) |
| Interior Superficial Resistance (ISR) | 1 | 0 | 0 |
| Gypsum Board (A) | 2 | 6 | 1 |
| Glass Wool (B) | 3 | 4 | 1 |
| Vapor Barreer Sheet (C) | 4 | 1 | 0 |
| Polyuretane Sandwich Panel (D) | 5 | 10 | 1 |
| Wall Air Chamber (E) | 6 | 7 | 1 |
| Polyuretane Sandwich Panel (D) | 7 | 10 | 1 |
| Exterior Superficial Resistance (ESR) | 8 | 0 | 0 |
| Interior Superficial Resistance (ISR) | 1 | 0 | 0 |
| Gypsum Board (A) | 2 | 6 | 1 |
| Vapor Barreer Sheet (C) | 3 | 1 | 0 |
| Roof Air Chamber (F) | 4 | 7 | 1 |
| Glass Wool (B) | 5 | 4 | 1 |
| Polyuretane Sandwich Panel (D) | 6 | 10 | 1 |
| Exterior Superficial Resistance (ESR) | 7 | 0 | 0 |
| Interior Superficial Resistance (ISR) | 1 | 0 | 0 |
| Wood Floor (F) | 2 | 9 | 1 |
| OSB Board (G) | 3 | 5 | 1 |
| Polyuretane Sandwich Panel (D) | 4 | 10 | 1 |
| OSB Board (G) | 5 | 5 | 1 |
| Exterior Superficial Resistance (ESR) | 6 | 0 | 0 |

Fig. 31

| | |
|---|---|
| F1: | $R = Th/\lambda$ |
| F2: | $X_{section} = \sum_{i=1}^{n} X$ |
| F3: | $\Delta SVP = \frac{\left(6.11 \cdot \frac{exp\left(\frac{(17.27 \cdot ITG)}{(237.3 + ITG)}\right)}{10}\right) IRH}{100} - \frac{\left(6.11 \cdot \frac{exp\left(\frac{(17.27 \cdot Tmin)}{(237.3 + Tmin)}\right)}{10}\right) ERH}{100}$ |
| F4: | $PV_0 = \frac{\left(6.11 \cdot \frac{exp\left(\frac{(17.27 \cdot ITG)}{(237.3 + ITG)}\right)}{10}\right) IRH}{100} - \Delta \quad SVP \cdot \frac{\delta_1}{\delta_{section}}$ |
| F5: | $T_n = \left\{ ITG - \frac{R_n(Tmax - Tmin)}{R_{section}} \ :n = 1,\ T_{n-1} - \frac{R_n(Tmax - Tmin)}{R_{section}} :n > 1 \right\}$ |
| F6: | $PV_n = PV_{n-1} - \Delta SPV \cdot \frac{\delta_n}{\delta_{section}}$ |
| F7: | $Td = C1 \cdot (Pv \cdot 10 - 3)C2 + C3\, ln\, (Pv \cdot 10 - 3) + C4$<br>*where:*<br>$\begin{pmatrix} C1 \\ C2 \\ C3 \\ C4 \end{pmatrix} = \begin{pmatrix} 82.45 \\ 0.12 \\ 3.06 \\ 196.81 \end{pmatrix} : 0.16\, Pa < Pv < 610.74\, Pa$, *and*<br>$\begin{pmatrix} C1 \\ C2 \\ C3 \\ C4 \end{pmatrix} = \begin{pmatrix} 33.38 \\ 0.22 \\ 7.16 \\ 246.76 \end{pmatrix} : 610.74\, Pa < Pv < 101340\, Pa$ |
| F8: | $\Delta T = t - td$ |
| F9: | $Section's\ Total\ Cost = \sum_{i=1}^{n} \$_i \cdot S_{section}$ |

Fig. 32

111a 110b 110c 110d 110e

| Layer Number | Layer Type | Density A (kg/m3) | Th (m) | λ (W/mk) | R (m2k/w) |
|---|---|---|---|---|---|
| | Max Exterior temperature: 37,4°C | | | | |
| | Min Exterior temperature: - 3°C | | | | |
| 1 | Exterior Superficial Resistance (ESR) | | | | 0.0400 |
| 2 | Polyuretane Sandwitch Panel (D) | 40 | 0.05 | 0.023 | 2.1739 |
| 3 | Wall Air Chamber (G) | | 0.15 | 1.3 | 0.1700 |
| 4 | Polyuretane Sandwitch Panel (D) | 40 | 0.05 | 0.023 | 2.1739 |
| 5 | Glass Wool (B) | 12 | 0.04 | 0.043 | 0.9302 |
| 6 | Gypsum Board (A) | 1000 | 0.015 | 0.44 | 0.0341 |
| 7 | Interior Superficial Resistance (ISR) | | | | 0.1300 |
| | | | | TOTAL: | 5.6521 |
| | | | | | |
| | ***Final Kos (W/m2 K)*** | | | | ***0.17692*** |

111b(1)

111a 110b 110c 110d 110e

| Layer Number | Layer Type | Density A (kg/m3) | e (m) | λ (W/mk) | R (m2k/w) |
|---|---|---|---|---|---|
| | Max Exterior temperature: 37,4°C | | | | |
| | Min Exterior temperature: - 3°C | | | | |
| 1 | Exterior Superficial Resistance (ESR) | | | | 0.0400 |
| 2 | Polyuretane Sandwitch Panel with rupture capsule (F) | 40 | 0.03 | 0.023 | 1.3043 |
| 3 | Metallic support | 7800 | 0.1 | 58 | 0.0017 |
| 4 | Metallic structural column (100x100mm) | 7800 | 0.15 | 58 | 0.0026 |
| 5 | Wall Air Chamber (G) | | 0.05 | 1.3 | 0.1700 |
| 6 | Polyuretane Sandwitch Panel (D) | 40 | 0.05 | 0.023 | 2.1739 |
| 7 | Glass Wool (B) | 12 | 0.04 | 0.043 | 0.9302 |
| 8 | Gypsum Board (A) | 1000 | 0.015 | 0.44 | 0.0341 |
| 9 | Interior Superficial Resistance (ISR) | | | | 0.1300 |
| | | | | TOTAL: | 4.7869 |
| | | | | | |
| | ***Final Ktb (W/m2 K)*** | | | | ***0.20890*** |
| | **Relation Kpt/Kso** | ***1.181*** | | | |

132 111b(2)

BIO-CLIMATICALLY ADAPTED ZERO-ENERGY PREFABRICATED MODULAR BUILDING AND METHODS THEREOF WITH THERMAL BRIDGE BREAKAGES

CROSS-REFERENCE TO RELATED APPLICATION

This application is a continuation in part of U.S. patent application Ser. No. 16/940,710, filed Jul. 28, 2020, which is incorporated by reference herein in its entirety.

TECHNICAL FIELD

The present invention relates generally to the field of construction of energy-efficient buildings and methods of constructing such buildings. More specifically, the present invention relates to a bio-climatically adapted Multi-Layered Building Envelope therefor.

BACKGROUND OF THE INVENTION

Since the moment humanity became aware of the irreversible negative impact that the unrestricted consumption of fossil fuels and other nonrenewable energy sources in the construction industry was causing on our planet, the need for developing environmentally sensitive housing and commercial buildings was born.

At the global level, we are facing the so-called World Energy Trilemma, characterized by the increasing difficulty of balancing the concepts of Economy, Energy, and Environment for a given society. On one hand, we demand more and more electric power, to the point one could say that we have become "energyvorous", demand which in the near future is only expected to keep growing. On the other hand, the production, transportation, transformation, and distribution of energy in its best form for human use (electrical power) is very expensive, and at the same time it usually produces a large impacton the environment to which it pertains (from the use of fossil energy—thermal power stations, combined cycle, etc., that prevail today, to the generation of major infrastructure projects for power generation, which impact is not negligible: hydroelectric dams, nuclear power plants and their waste, etc.).

In the United States, buildings are the biggest primary energy consumers, being responsible for more than 40% of the total fossil energy consumed by the nation. The residential and commercial sector is also responsible for almost 35% of the nation's total greenhouse gas emissions. In addition, the substantial amount of natural resources consumed, and the copious amounts of waste generated by the traditional processes of building and demolishing housing and other structures, evince the desirability of creating environmentally sensitive buildings, including for housing.

These facts highlight the relevance of reducing both building energy use and building greenhouse gas emissions as a key to balancing the Energy Trilemma. For this reason, the development of environmentally sensitive buildings has become a trend in the United States and in the world, with particular growth in the last decade.

The challenge of reducing the energy consumption of a building structure resides both in the sustainable generation of the energy it consumes and in the efficiency with which it utilizes such energy. Therefore, energetic independence is closely tied to the energy-efficiency of the Building Envelope, since the energy requirement for heating and/or cooling to keep the interior of the house at a comfortable temperature can be significant, globally accounting for over 35% of all energy consumed in buildings and rising to over 60% in cold climates.

As with every new challenge technology faces, the earlier attempts of developing energetically independent buildings either failed to achieve the desired degree of energy-efficiency or did it at a cost which made them absurdly unaffordable for a regular buyer. In 1996, the "Passivhous Institute" was founded in Germany to establish new standards for buildings pursuing a higher degree of energetic independence, but these houses still had a relatively inefficient performance and a very high cost, besides maintaining a substantial degree of greenhouse gas emissions during its construction and its useful-life. More recently, evolving from the Passivhous, the concept of "Zero-Energy homes" was born.

Zero-Energy homes combine advanced design and superior building systems with energy-efficiency and on-site solar panels to produce as much renewable energy as they consume over the course of a year, leaving the dwellers with a zero-dollar electricity bill, and a Zero-Emissions home. The main advantage of Zero-Energy homes for the home owner is the low cost of utilities, while at a national level it has the great advantage of a much lower environmental impact. Additionally, when implemented at the community level, Zero-Energy homes improve energy security and resilience against power outages and natural disasters.

However, nowadays, the initial investment required to build a Zero-Energy home is high. For the regular consumer, the desire of acquiring sustainable housing (and ideally, a Zero-Energy home) is countered by the much more pressing need of getting affordable housing. Today, the high costs of sustainable buildings make owning a house designed with an environmentally sustainable concept, and particularly one that meets the ambitious standards of being a Zero-Energy home, a luxury that only a few can afford.

Thus, the paramount importance of developing much more affordable Zero-Energy housing and other buildings such as commercial buildings becomes each day more pressing.

The goal of obtaining commercially viable Zero-Energy buildings is of such an importance that major regions of the world are developing policies to move toward them. The ASHRAE Vision 2020 report sets out requirements for enabling them by 2030. Numerous incentive policies, such as investment subsidies, feed-in tariff, net-metering schemes, etc., have been applied to promote the construction of Zero-Energy homes and buildings. Such programs have met with limited success so far for several reasons, one of them being the inherent difficulty of achieving a Building Envelope which is both energy-efficient and cost-efficient. As a result of this difficulty, only a handful of buildings that actually meet the Zero-Energy standard exist in the world, and none of them was built in a carbon-neutral, affordable manner.

Prefabricated homes are generally a good way of achieving affordable housing and reducing the use of natural resources and the greenhouse gas emissions during the construction. However, the current state of the art of prefabricated homes does not provide any options able of achieving the Zero-Energy goal.

For those reasons, we believe that the disclosed invention will provide substantial advancement to the field and become a valuable tool for housing developers, manufacturers and builders, in the quest for obtaining affordable Zero-Energy homes and buildings.

SUMMARY OF THE INVENTION

An affordable Zero-Energy prefabricated modular building such as for residential housing, commercial or industrial use—among other purposes—is achieved by applying some or all of the following aspects:

(a) Modular construction, in which relocatable Building Modules are pre-manufactured and then transported to the final location of the building, where they can be arranged and connected to adjacent Building Modules in different configurations to provide a building in accordance to multiple possible models of different floor plans. These Modules include a relocatable load-bearing Support Structure which, in the preferred embodiment, is made of hot rolled steel members. This structure includes a plurality of Aeriated Frames, which have the dual purpose of providing structural stability to the building and of providing support for the Inner and Outer portions of the Building Envelope, defining air chambers between said Inner and Outer portions, the thicknesses of these air chambers being relevant for the application of the Calculation Methods included in this disclosure, which is why the structure needs to be designed from the beginning with the Zero-Energy goal in mind. Means for connecting adjacent Building Modules, a foundation providing structural support to said Building Modules and means for attaching said Building Modules to said foundation are also provided.

(b) Sustainable generation in situ, over a year, of the totality of the electric power that the building is projected to consume over that same year. This projection may be obtained based on the estimated hours of daily operation of each device, in such a way that the totality of the electricity needs for household functions (in the case of a residential dwelling, the electricity needed for lighting, heating, refrigeration, sockets for the availability of operation of home appliances: TV, Computers, washing machines, refrigerators, etc.) are covered by renewable energy generated in situ. This goal is achieved by virtue of a solar power generator and/or other renewable sources appropriately sized for that end. In some embodiments, means for energy storage may also be provided.

(c) An energy-efficient Building Envelope achieved using high-performance fenestration and a Layered disposition of Envelope Elements in the Wall-, Roof- and Floor Sections that constitute the building's Thermal Envelope. These Envelope Elements are arranged in such a way that results in both the air barrier and the thermal barrier of the building being substantially continuous. These Envelope Elements may include sound and temperature insulating Layers, (such as glass wool Layers), vapor barrier Layers, a plurality of Structural Insulated Panels —in particular, for the preferred embodiment, of Polyurethane Sandwich Panels—a plurality of boards including wood and/or gypsum-type boards, for flooring support, wall coverage and/or suspended ceilings, among other uses, and, for some embodiments, additional Aeriated Supporting-Frames with the resulting air chambers that they define. These elements are selected so that, and disposed in a spatial configuration so that, the conditions set out by the applicable Calculation Methods included in this disclosure are satisfied.

(d) Diminished risks of superficial and interstitial water condensation supported by a method that compares the projected temperature at the interior surface of each of the projected Envelope-Layers to the dew point temperature at those surfaces and discards those configurations in which the dew point is higher;

(e) Low environmental impact, achieved by means a choice of materials and methods of construction that involve a lower consumption of natural resources, combined with the ability to generate in situ, manage and efficiently use the electric power needed to cover the energy needs of the building, substantially reducing the greenhouse emissions associated to fossil energy use and thus reducing the building's carbon footprint, thanks to the reduction of greenhouse gas emissions during the constructive process, as well as during its assembly and fundamentally during its useful life. This reduction in the environmental impact of the building may also be furthered, in some implementations, by the use of recycled materials, the environmentally-sensitive management of waste, and the reduction of the water footprint of the building thanks to the incorporation of a rain water collection and storage system; and (f) Breakage of Thermal bridges that exist, due to the construction process, in the unions between adjacent modules and between outer and inner panels that are part of the envelope corresponding to each module, with the use of a Thermal Bridge Rupture Capsule inserted between the panels and separated by the distance "L" in all of the envelope sections (ceilings, walls and floors)

The above-mentioned aspects are bio-climatically adapted by taking into consideration the relevant bio-climatic conditions for a bio-climatic zone in general or for the specific projected location of the building in particular, as a way for improving energy-efficiency and/or reducing costs while achieving the specified Conditions. These relevant bio-climatic conditions for the sizing of the solar power generation system include the maximum and minimum annual temperatures, the ranges of geographical latitude variations to be considered and the radiation level. For the Calculation Methods, these relevant bio-climatic conditions include the maximum and minimum annual temperatures and the relative humidity spectrum at the analyzed location. These bio-climatic conditions are the ones to be considered every time reference is made—in this specification and in the appended claims- to the "bio-climatic conditions of the projected location of the building", being considered as the "projected location of the building" the geographic location where a specific finalized building or group of buildings is planned to be placed, which could range from being as specific as a town, zip-code or latitude-longitude coordinates, to being s general as a bio-climatic zone or a whole country. In any case, the maximums, minimums and averages of the relevant bio-climatic conditions applicable to that area are considered for the Calculation Methods. In some embodiments, the atmospheric pressures, precipitations, wind, the peak sun hours, and other bio-climatic conditions may also be considered. These variations create differences in terms of energy-efficiency, determining fundamental changes in the thermal insulation and hygrothermal conditioning of the different individual implementations of the building, as well as in the processes of sustainable generation of electric power to be used. That is why, for different temperature ranges (maximum and minimum temperatures), different ranges of relative humidity, different results will be obtained. For this reason, the requirements of structural insulation packages throughout the Envelope will vary for different implementations. This bio-climatic adaptation is achieved by means of determining the most accurate parameters for the renewable energy power generation system(s) of the building and by means of selecting the configurations of materials—with their corresponding physical properties—, dimensions, attributes and design of the relevant elements of the Building Envelope and the Support Structure, that result adequate according to the specified standards.

To this end, Calculation Methods are provided to define the relevant parameters for providing bio-climatic adaptation to the building. These methods include the “K-Max Method” in which the heat transfer at each of the projected intervening Envelope-Layers is calculated and those configurations in which the internal temperature of the building wouldn’t meet the defined acceptable standard based on the bio-climatic conditions of the projected location of the building are discarded. This method is used in conjunction with the No-Condensation Method which evaluates water condensation risks, in such a way that configurations which don’t satisfy both the K-Max Condition established by the K-Max Method and the No-Condensation Condition established by the No-Condensation Method are discarded, thus ensuring a bio-climatically adapted, energy-efficient Building Envelope which is at the same time free of water condensation and its consequent humidity problems.

An Optimization Method is also disclosed, which provides the steps for optimizing the relevant parameters in such a way as to minimize the total cost of the Building Envelope or the building as a whole, or to maximize the energy-efficiency of the building and/or other parameters, based on an array of possible options of materials—with their associated physical properties and commercial prices—that the User (manufacturer/builder, etc.) decides to include for their consideration in the application of the method.

Implementations may further include one or more of the following features:

(a) A Home Automation System for energy control and management, including a built-in computer program designed to provide the user with control of the generation and consumption of energy within the building, thus facilitating energy management. In residential applications, this system may be implemented to provide dwellers with an increased security in the energy supply, as well as increased efficiency in the use of it, hygrothermal comfort, and environmental sustainability. This may be achieved by the implementation of user-friendly software—optionally including a mobile application or other means for remote management—that allows the user to control the range of operating temperatures and lighting by premises. It also may incorporate a sensor system for the automatic activation and deactivation of lighting and other energy-consuming home systems and appliances, thus reducing vampire energy consumption.

(b) A solar water heater for sanitary hot water generation.

(c) A rainwater collection and storage system.

(d) LED lighting, and high-performance appliances (e) In some cases, means for converting any surplus energy being left into a form suitable for selling it back to the grid; and/or (f) A method for automatically determining the properties and positions of the primary, secondary and tertiary framing members of the Support Structure of one or more Modules in accordance with these specifications, in function of the desired dimensions for the Module and of a limited set of options for open spans, doors and windows, with their respective quantities, positions and sizes, in such a way that the resulting Support Structure is structurally stable, supports the doors, windows and open spans at the specified locations and provides Aeriated Frames having a thickness so defined as to enable the finalized building to satisfy the Conditions set out by the Calculation Methods included in this disclosure.

A person of ordinary skill in the art will further be able to recognize in this specification enablement for implementing a wide array of practical applications of the inventive concepts here disclosed that go beyond the specific materials, methods and designs being specifically described, including but not limited to: buildings utilizing methods and materials like the ones mentioned above, but without necessarily being Zero-Energy, such as an energy-efficient building that doesn’t need to produce in situ all (or any) of the energy it demands, a method for the construction of the buildings, means to adapt the above-mentioned energy-efficient Building Envelope for its installation at a Framed Support Structure that can be different from the one here disclosed, alternative methods for the calculation and/or optimization of the acceptable parameters of the Intervening-Layers of an energy-efficient Building Envelope, the above-mentioned method for automatically designing the Modules’ Support Structure, a panelized version of the Building Envelope, and a single-Module Zero-Energy building unit according to the disclosed materials, designs and methods, to use for example as an energy-independent classroom, storage unit, or animal isolation chamber, among many other possible uses.

BRIEF DESCRIPTION OF THE DRAWINGS

FIG. 1 is a schematic perspective view of an embodiment of an Aeriated Frame in accordance with the present invention.

FIG. 2 is a schematic perspective view of an embodiment of a Support Structure in accordance with the present invention.

FIG. 4A is a side sectional elevation view an embodiment of a house in accordance with the present invention, constructed from three Modules.

FIG. 4B is a perspective view of the house of FIG. 4A.

FIG. 4C is a floor plan view representing the first floor of the house of FIGS. 4A and 4B.

FIG. 4D is a floor plan view representing the second floor of the house of FIGS. 4A, 4B and 4C.

FIG. 7 is a side sectional view of an embodiment of the union between an Envelope-Wall-Section and an Envelope-Floor-Section, in accordance with the present invention, also depicting an embodiment of the means for securing a Module to a foundation.

FIG. 8 is a side sectional view of an embodiment of the union between an Envelope-Wall-Section and a sloped Envelope-Roof-Section, in accordance with the present invention.

FIG. 20*a* depicts an example of a spreadsheet used for setting up a possible structure of the Sub-table one of Table one in an illustrative embodiment of the Calculation Methods in accordance with the present invention.

FIG. 20*b* depicts an example of a spreadsheet used for setting up a possible structure of the Sub-tables two and three of Table one in an illustrative embodiment of the Calculation Methods in accordance with the present invention.

FIG. 21 depicts an example of a spreadsheet used for setting up a possible structure of Table two in an illustrative embodiment of the Calculation Methods in accordance with the present invention.

FIG. 23 depicts an example of a spreadsheet used for setting up a possible structure of Table three in an illustrative embodiment of the Calculation Methods in accordance with the present invention.

FIG. 25 depicts an example of spreadsheet used for setting up a possible structure of Table four in an illustrative embodiment of the Calculation Methods in accordance with the present invention.

FIG. 29 depicts an example of a spreadsheet used for setting up a possible structure of Table five in an illustrative embodiment of the Calculation Methods in accordance with the present invention.

FIG. 31 depicts the formulas used in in an illustrative embodiment of the Calculation Methods in accordance with the present invention.

FIG. 32 depicts an example of spreadsheet used for setting up a possible structure of Table four in an illustrative embodiment of the Calculation Methods in accordance with the present invention, comparing the opaque envelope with a similar envelope using a thermal bridge breakage capsules.

DETAILED DESCRIPTION AND BEST MODE OF IMPLEMENTATION

Figure 3A:
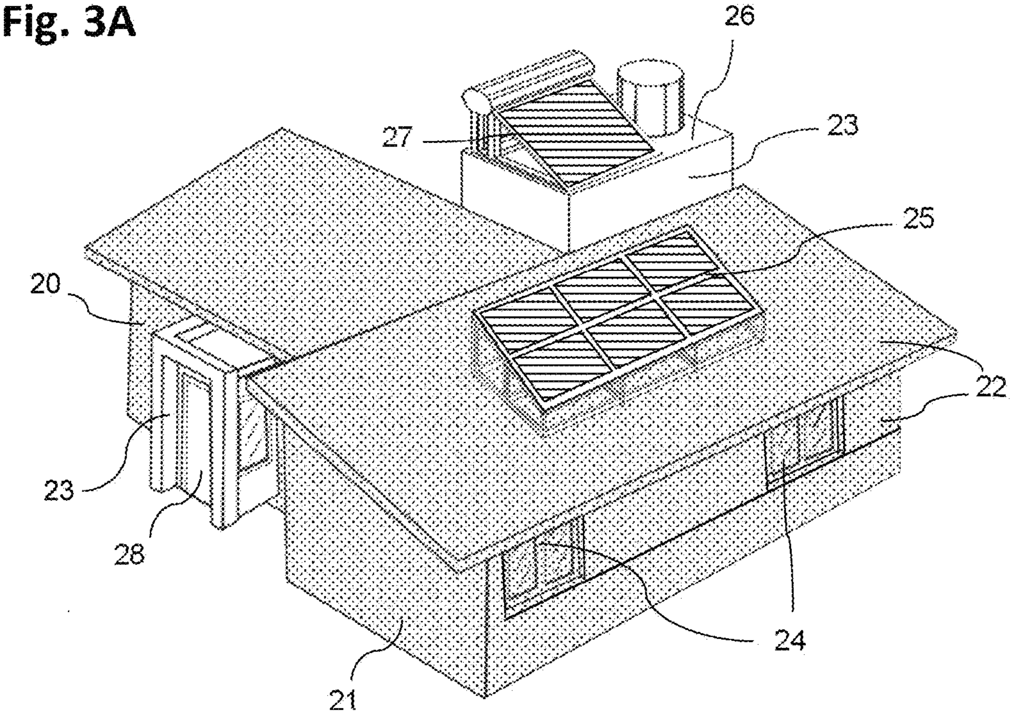
FIG. 3A is a perspective view of an embodiment of a house in accordance with the present invention, constructed from two Modules.

Disclosed is a Zero-Energy modular building such as a single-story or multi-story home, residential building, commercial building, or other kinds of buildings, in which the Zero-Energy goal is attained in a cost-efficient manner thanks to the incorporation of Support Structure and energy-efficient Building Envelope, both being a bio-climatically adapted.

As used in this specification and the appended claims, the term "Zero-Energy" refers to a building that can generate in-situ, over a year, the totality of the electric power that the building is projected to consume over that same year. It is important to note that, as this concept is based on a projection, the actual level of energy consumption can ultimately result greater than the level estimated by the projection, if, for example, the family living in the household has a significantly greater level of consumption than the average use considered by the projection. This would not mean that the building is not Zero-Energy, as considered in this disclosure and claims, if the projection was made according to the following guidelines:

(a) The projected energy consumption level should be obtained by a thorough analysis of reliable, accurate and up-to-date statistics when available or, for example, by consulting one or more firms or independent professionals possessing the expertise to provide such information.

(b) If several professional opinions are received, the most burdensome one should be considered.

(c) When the average quantity of each type of device used per household, the average energy use for each device, and the average hours of daily, monthly and/or yearly operation of each device are known, the calculation should be made in such a way that the totality of the electricity needs for household functions (in the case of a residential dwelling, the electricity needed for lighting, heating, refrigeration, sockets for the availability of operation of home appliances: TV, Computers, washing machines, refrigerators, etc.) are covered by the renewable energy generated in situ (over a year).

(d) As one of the most important factors involved in the calculation of the projected energy consumption level of a building is associated with the energy needed to heat or cool its various inner rooms, the bio-climatic conditions of the projected location of the building (including the outer maximum and minimum annual temperatures), need to be taken into account for this calculation.

(e) Moreover, as the Zero-Energy modular buildings here disclosed need to satisfy the "K-Max" and "No-Condensation" Conditions as detailed further on in this specification, the calculation of the energy level needed to be generated in-situ in order to make the building Zero-Energy, needs to be made after the total thermal conductivity of the Building Envelope has been defined, and therefore the energy demand for heating and cooling can be accurately predicted and considered.

(f) Lastly, it is important to add at least an extra 10% to the calculated energy consumption level to cover for possible deviations from the average.

If the calculations of the projected consumption level were made in a reliable way by following the above-mentioned guidelines, the building will still be considered as Zero-Energy for the purposes of this disclosure and claims, even if in fact, once the year passes, the actual energy consumption surpasses the actual renewable energy generation of the building. For this reason, these buildings are not required to but optionally may be connected to the grid in order to cover for any eventual energy demand that the in-situ renewable power generation of the building proves unable to provide.

A home or building constructed in accordance with the design, materials and methods here disclosed, have the added advantage of lowered Green House Emissions, being susceptible of achieving, in addition to the Zero-Energy goal, also a Zero-Emissions goal. In the context of the present specification and claims "Zero-Emissions" refers to the null emission of Green House Gasses in accordance to the Kyoto Protocol. The emissions considered for this assessment are those incurred during the operation and life of the project, when the building is in its modus operandi and with its occupants living in it or using it for its final purpose (commercial, residential, industrial, or otherwise), consuming energy day to day. Useful life represents the largest portion of the total energy consumption of a building during its entire life cycle (65% to 70% consumption) and here is where a building in accordance with the present invention is able to achieve the Zero-Emissions goal. These emissions are calculated through the product of the projected energy consumption level as calculated above by the corresponding emission factor (or coefficient) as regulated by the United States' Energy Information Administration (EIA). Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not to be interpreted as limiting. Instead, the intended function of this disclosure is to exemplify some of the ways—including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Thermal Bridges

A thermal bridge can be defined as the isolated or linear area of a building envelope, in which the Kpt thermal transmittance results in a value greater than the surrounding areas or generally greater than the Keo thermal transmittance of the opaque envelope. These thermal bridges, constructively speaking, are the product of the construction processes, where they are generally manifested by the fixations and linkages that we must necessarily make in order to link diverse elements in the formation of the building structure.

In short, it is a surface, where a discontinuity of the insulating surface of a construction is produced.

As a consequence of this discontinuity of the insulating characteristics of the materials, the relative energy losses increase, due to the increase in the value of Kpt due to changes in the properties of the materials, which are necessary to make, in order to be able to link different elements (envelopes such as panels, or coatings) that make up the structure. (See FIG. 1)

For all the analyzes presented, it is hypothesized that the energy stream pathways are produced from the outside to the inside of the fenestration that is being studied.

Thus, the relative energy loss in thermal bridges is hereby defined as the maximum tolerable level, as the relation:

$$Kpt/Kso <= 1.25 \tag{1}$$

where:

Kpt: Thermal bridge thermal transmittance (W/m2° k)

Kso: Thermal transmittance of the opaque surface design without thermal bridge (W/m2° k)

That is to say, it is tolerable, at most, for commercial and residential constructions, that the value of the thermal transmittance of the thermal bridge Kpt is up to 25% higher than the thermal transmittance of the analyzed envelope design.

For cases where the insulation requirements of enclosures are more demanding, such as in industries of a diverse nature (refrigeration, meat, laboratories, etc.) as well as in health rooms and other types of highly demanding constructions, the equation (1) will have the following relation:

$$Kpt/Kso <= 1.12 \quad (2)$$

where:

Kpt: Thermal Transmittance of the Thermal Bridge (W/m2° k)

Kso: Thermal transmittance of the design opaque surface without thermal bridge (W/m2° k)

Referring to the drawings in more detail, FIG. 1 schematically illustrates what is considered to be an "Aeriated Frame" in the context of this specification and claims. Every time that the terms "Aeriated Frame" or simply "Frame" are used in this specification and in the appended claims, they refer to a rigid structure satisfying these three conditions:

(a) It is generally planar (meaning by this that it has a thickness substantially smaller than its length and width and that it is susceptible of being parallelly attached, horizontally or vertically, to a panel or board in such a way as to support it);

(b) it allows the free flow of air in all three directions; and (c) no more than 30% of its volume is occupied by solids.

The illustrative Frame depicted by the image is formed by an arrangement of elongated members, but this does not necessarily have to be the case. The Frame may have other shapes and be made of different materials, and it would still be an "Aeriated Frame" as long as it satisfies the above-mentioned conditions. The figure illustrates this concept in more detail and shows a possible configuration of an Aeriated Frame. The Aeriated Frame is intended to be a part of a "Support Structure", as the one shown in FIG. 2. For this reason, in FIG. 1 the position of the Frame relative to the Support Structure is depicted by the projection 1, of where the columns of the Support Structure would go. In this case, the shown Frame is an example of a "Floor-Frame", and the projection lines 1 depict where the Wall-Frames of the Support Structure would be. This way, an Inner Face 2, facing the interior of the Support Structure and an Outer Face 3, facing the exterior of the Support Structure are defined. These two Faces further define a thickness 4, measured from said Inner Face to said Outer Face, which will at the same time define the thickness of the air chamber that it will create between any two surfaces coupled to its Inner and Outer Faces respectively. In this particular example, the Frame consists of a Primary Structure 5 (an outer rectangle crossed by two longitudinal and two transversal beams) and a Secondary Structure 6 (two secondary beams coupled to the Primary Structure 5). This is a very simple Frame for illustration purposes, but in the preferred embodiments most Frames would be more complex than this. For example, for a small Module, the main rectangle of a Floor-Frame could measure 6 m by 3.5 m and be formed by hot rolled steel beams of 10 cm square section, and have, as in the figure, 9 internal rectangles (3×3), but, for a larger Module, the main rectangle of a Floor-Frame could measure 12 m by 5 m and contain 20 internal rectangles (5×4), using the same kind of beams. Any size within these two examples is allowable. These sizes are not absolute maximum and minimum limitations. Instead, the limitations are given by the legal and technical transportation requirements applicable to each individual project, taking into account that the finalized Module should be:

(a) "Relocatable", meaning, as used in this specification and the appended claims, that the whole Module should be able to be safely transported by ground, air, or sea to the projected location of the building, having a structure and dimensions suitable for its transportation by the chosen means to the final location without damage to its components; and (b) "Suitable for human habitation", according to the applicable regulatory Framework for building constructions at the projected location of the building.

Thus, a reasonable height for a Wall-Frame could be for example 3.5 m. For the 12 m long Floor-Frame described above, and with this height, a Wall-Frame for this Module could be crossed by 2 longitudinal beams and four columns, defining 15 internal rectangles (5×3) but all of which do not need to be of the same size. For example, if a window is desired to be placed in the middle strip, measuring 1.2 m of height by 1.8 m of width, the crossing beams should be placed accordingly, as to allow the placement of the window at the desired location. Additional framing members for supporting the window should be used in this case. A Roof-Frame for a Module will probably need more secondary beams (such as purlins) than a Floor-Frame of the same size, while its Primary Structure could have fewer framing members than those of the Floor-Frame. For example, for the 6 m by 3.5 m Module described above, the Roof-Frame could be crossed only by one longitudinal beam and two transversal beams forming 6 rectangles, and then by a plurality of purlins coupled to these. It is important to note that the Frames do not need to be rectangular. Other shapes and variations are allowable as long as they define a load-bearing Support Structure for a Building Module having a floor, a roof and walls.

One of the conditions that an Aeriated Frame needs to satisfy, as explained above, is that the air flow within the Frame in all three directions should be unrestricted. That is represented by the sets of arrows 7, 8, and 9 of FIG. 1. The arrows 7 represent the air flow in transversal direction. The arrows 8 represent the air flow in longitudinal direction. These arrows are curved, in contrast to the previous ones, because in the example Frame shown the air should follow a curved path to avoid the framing members and find its way to the opposite side. The arrows 9 represent the air flow in vertical direction (from the Inner Face to the Outer Face, in this case). The arrows are shown pointing one way for the clarity of the representation but actually the air should be able to freely flow back and forth in each direction (all ways). The Aeriated Space 10 is, then, the mostly "empty" space, with a maximum of 30% of its volume being occupied by solids, defined by the Inner Face, the Outer Face and the outer boundaries of a Frame.

FIG. 2 shows a simplified example of a Support Structure made up of Aeriated Frames, these Frames being a Roof-Frame 11, four Wall-Frames 12 (in other embodiments they may be more than four), and a Floor-Frame 13. All of the Frames have an Inner Face 2, facing the interior of the structure and an Outer Face 3, facing the exterior of the structure. These Inner Faces define a Hollow Space 15, which has a size suitable for human habitation. The original thickness 4 of a Frame is modified when a Secondary Structure 6 is added to the Primary Structure 5, thus defining a new thickness 17 and a new Outer Face 18. The final thickness of the new Aeriated Space 19—that is defined after all secondary, tertiary elements, etc., are added to the Frame—is the one that will ultimately define the thickness of the air chamber. This thickness 17 should be equal for all the Envelope-Frames of the same Type. "Envelope-Frames", in the context of this specification and the appended claims, are all the Aeriated Frames which are purposed to hold an Envelope-Section, understanding by "Envelope-Section" those Wall-, Roof- and Floor-Sections that once the Building Modules are connected together as planned in the floor plan, will be adjacent to the exterior of the building or to a non-climatized space. These Envelope-Sections must be cladded in such a way that, in conjunction with high-performance exterior fenestration, results in both the air barrier and the thermal barrier of the finalized building being substantially continuous. Contrarily, those Frames which will not hold an Envelope-Section are considered as Non-envelope-Frames. The Envelope-Frames can be of three Types: Wall-Frames, Roof-Frames and Floor-Frames. This means that, for providing a thermally homogeneous Building Envelope, the thickness 17 of all the Envelope-Wall-Frames, across all of the Modules, should be substantially identical to each other, the thicknesses 17 of all the Envelope-Roof-Frames, across all of the Modules should also be substantially identical to each other, and the thicknesses 17 all the Envelope-Floor-Frames, across all of the Modules should be substantially identical to each other too. The thicknesses of Envelope-Wall-Frames, however, may be different from those of Envelope-Roof-Frames and Envelope-Floor-Frames, and the Envelope-Floor-Frames different from the Envelope-Roof-Frames. Furthermore, the thicknesses of the Frames that are not purposed to hold Envelope-Sections (Non-envelope-Frames, for example those which will hold internal walls or internal roofs/floors in multi-story buildings), do not need to be the same than those which will belong to Envelope-Sections (they can be thinner, as thermal isolation is not required for internal walls, or thicker, if the separation between floors need additional framing for structural support). A same Frame can be mixed, having some areas purposed to hold Envelope-Sections and other areas purposed to hold Non-envelope-Sections. In this case, only the areas of the Frame that are purposed to hold Envelope-Sections should comply with the required thickness. The Primary Structure 5 includes, in this particular example, a cuboid perimetral container 16 whose edges are crossed by two longitudinal beams for every Frame and two additional transversal beams for the Roof-Frame and the Floor-Frame. These numbers may of course be different depending on the size and design on the Module. The Frames need not be rectangular, and the Support Structure may take the form of any regular or irregular prismatic shape in addition to cuboids. Moreover, the Support Structure does not even need to contain elongated members, as long as the Frames are planar and Aeriated as defined above. The general cuboid design configuration shown by FIG. 2, and minor variations thereof, however, are preferred because of their practicality, ease, and the cost-effectiveness of their making. In FIG. 2, the cuboid perimetral container 16 defines 6 Inner rectangular openings 14 (one for each Frame).

Figure 3B:
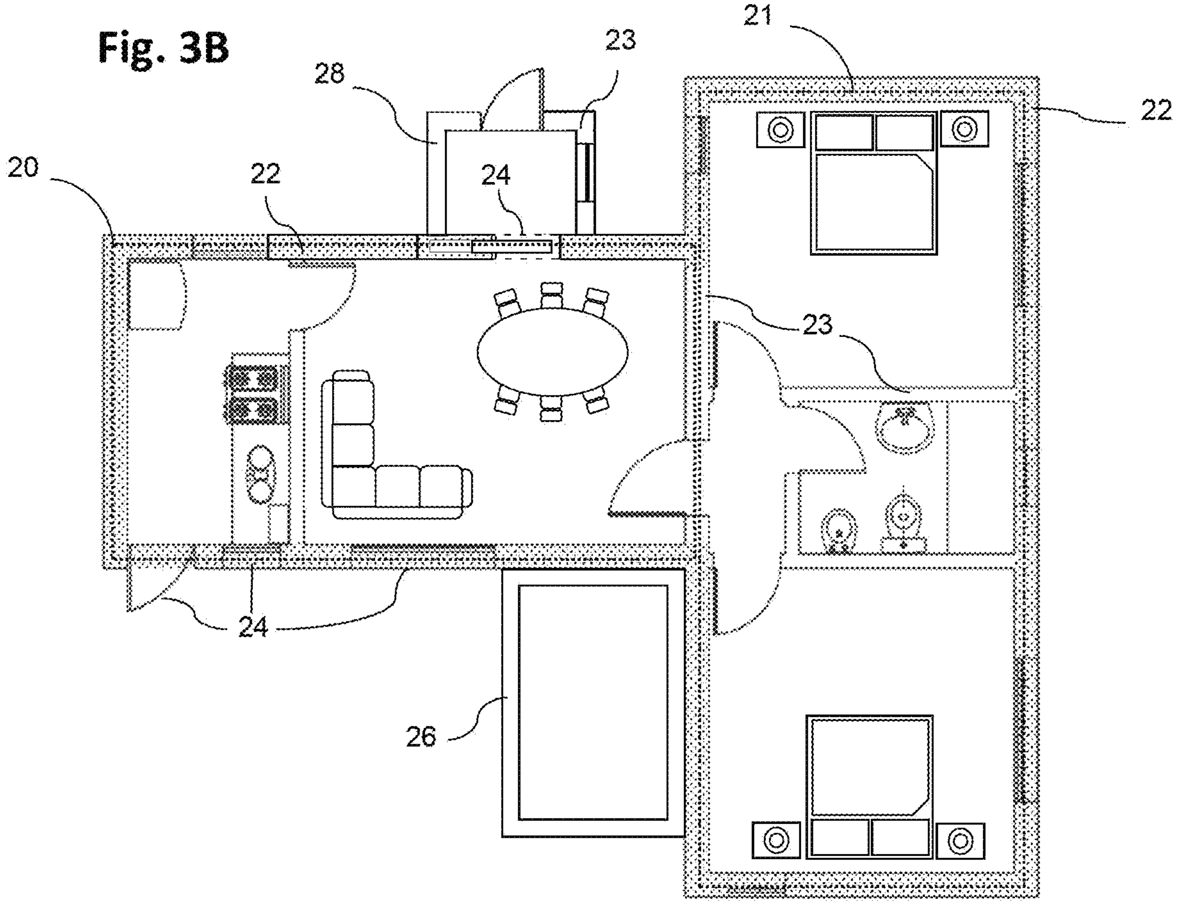
FIG. 3B is a floor plan view of the house of FIG. 3A.

FIG. 3A and FIG. 3B show a simple single-story two-Module home, while FIGS. 4A, 4B, 4C and 4D show a simple two-story, three-Module home, all according to some possible embodiments of the present invention. In them, two Building Modules (20 and 21) are shown in FIGS. 3A, 3B, 4A, 4B and 4C, and a third Building Module 29 is shown in FIGS. 4A, 4B and 4D. The terms "Building Module" or simply "Module" as used in this specification and the appended claims, refer to a relocatable prefabricated unit formed by a load-bearing Support Structure as described by this specification and the Envelope and Non-envelope-Wall-, Floor- and Roof-Sections (in some cases, including fenestration) coupled to it, and that will be transported as a whole to the building site for its final installation. A Module's Support Structure does not need to be completely cladded before its transportation to the building site. Instead, some areas of it may be purposely left uncovered, to be finished in situ once the Modules are affixed to any adjacent Modules and/or to the foundation. This can facilitate the unions between Modules, as will be shown later in more detail. In FIGS. 3B, 4A, 4C and 4D, the Modules 1, 2 and/or 3, are signaled by the dotted rectangles 20, 21 and/or 29 respectively. These rectangles designate the two or three distinct rectangular areas of the home, while in the perspective views shown in FIG. 3A and FIG. 4B, the Modules are generally depicted as being each one of the shown generally cuboid 3D shapes that form the homes. The dotted surfaces 22 for all these figures designate the Envelope-Sections of the homes. Examples of Non-envelope-Sections are shown in FIGS. 3A, 3B, 4C and 4D with number 23. In FIG. 3A a supporting structure 26 for a solar water heater 27 can be seen. That structure does not need to be climatized because it is not purposed for human habitation. FIG. 3B, also depicts this supporting structure 26. Besides, both FIG. 3 show some walls 23 which are Non-envelope-Sections (because they are not adjacent to both exterior or non-climatized areas and interior or climatized areas), and so do FIGS. 4C and 4D. In FIGS. 3A, 4A and 4B, solar panels for the solar power generation system 25 are shown. A properly sized renewable energy power generation system is essential to provide a Zero-Energy home or building. FIGS. 3A and 3B also show a non-climatized entrance hall 28. As its walls are Non-envelope-Walls, to maintain the continuity of the air and thermal barriers of the Envelope, the inner wall adjacent to that is an Envelope-Wall 22 and the sliding door connecting to it, a high-performance door 24. Contrarily to this entrance hall, which is non-climatized, FIGS. 4A, 4B, and 4C show a climatized entrance hall 30. In this design, the hall is thermally protected by Envelope-Sections and high-performance fenestration. Whenever the term "high-performance" is used in reference to windows, doors or fenestration in general in the context of this specification and the appended claims, said fenestration is subject to the following requirements: U-value of no more than 0.30 $Btu/h{\cdot}ft^{2}{\cdot}°$ F. for fixed fenestration, no more than 0.38 $Btu/h{\cdot}ft^{2}{\cdot}°$ F. for operable fenestration and no more than 0.77 $Btu/h{\cdot}ft^{2}{\cdot}°$ F. for entrance doors, all having an Air Leakage of no more than 0.25 $cf{\cdot}m/ft^{2}$. High-performance fenestration is shown in FIGS. 3A, 3B, 4B, 4C, and 4D with the reference number 24. A staircase 31 connects the first-floor and second-floor modules of FIGS. 4C and 4D.

Figure 5:
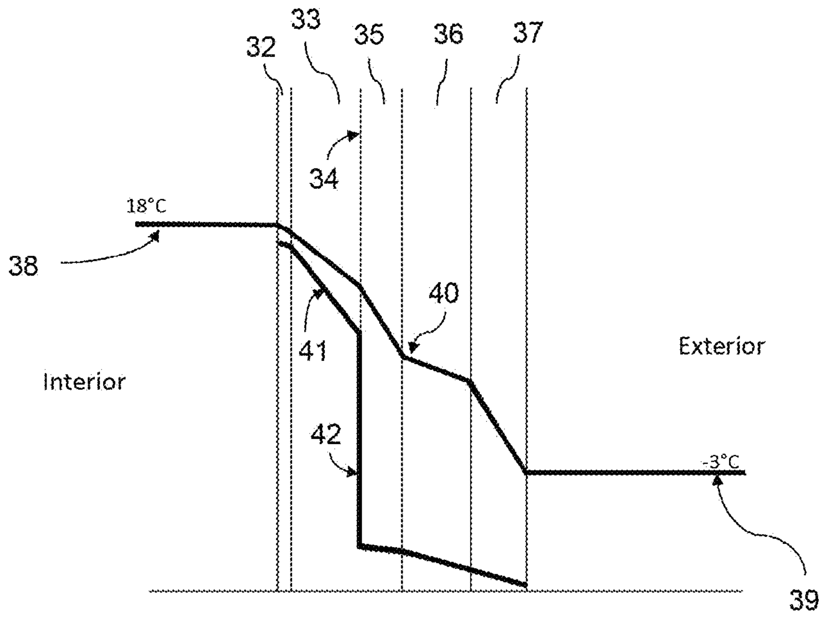
FIG. 5 is a schematic representation of a configuration of Envelope-Layers depicting the thermal behavior of an embodiment of an Envelope-Wall-Section, in accordance with the present invention.
Figure 6:
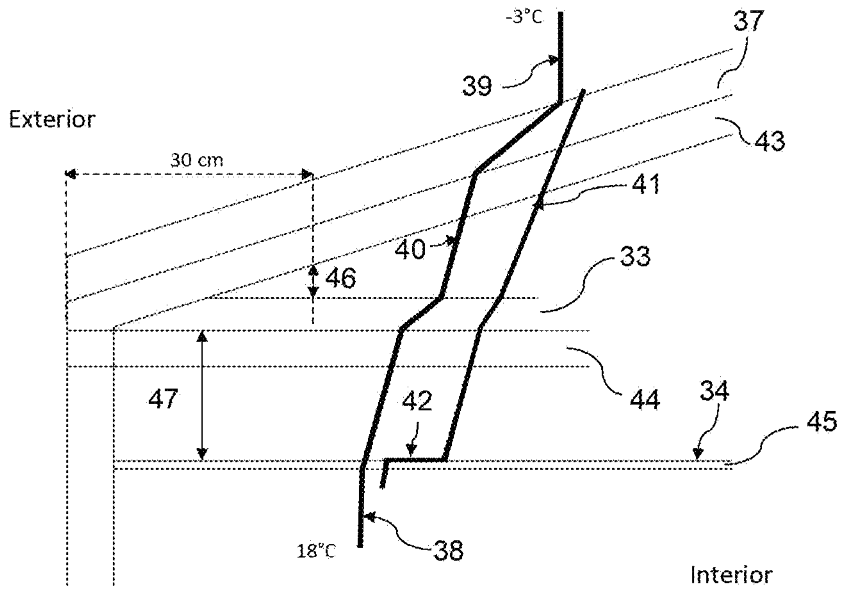
FIG. 6 is a schematic representation of a configuration of Envelope-Layers depicting the thermal behavior of an embodiment of a slopped Envelope-Roof-Section, in accordance with the present invention.

FIG. 5 and FIG. 6 show schematic representations of the Envelope-Layers for an embodiment of an Envelope-Wall-Section (FIG. 5) and an embodiment of a sloped Envelope-Roof-Section (FIG. 6). Basically, the "Envelope-Layers" (or, simply "Layers") in accordance with this invention are all the Structural Insulated Panels, Boards, Supporting-Frames, Sheets, Insulating-Layers and any optional Additional-Intervening-Layers that form part of an Envelope-Wall-Section, an Envelope-Roof-Section, or an Envelope-Floor-Section. The concept of layers in this specification and the appended claims, is applied in a general way that does not imply that these layers need to be parallel to be considered as Layers, as FIG. 6 illustrates for the case of a sloped roof. Typically, though, Layers in many embodiments of the Floor and the Wall Envelope-Sections will be parallel (they may present many different variations, but as long, as they behave as "Intervening-Layers" they are still considered Layers in the context of this disclosure and claims). The non-parallel Layer case will be present in many possible embodiments of Modules having sloped roofs. The importance of these Layers is that they need to be applied all around the Envelope-Sections of the building in a continuous fashion, in such a way as to ensure, together with the high-performance fenestration, the continuity of the thermal barrier and the air barrier of the Envelope, and in such a way that the Calculation Methods described by this disclosure can be accurately applied. For example, in an embodiment in which a home has both a sloped Envelope-Roof-Section, and a non-sloped Envelope-Roof-Section, the Layers for both sections should be made of the same materials, be placed in the same order of arrangement and have the same thicknesses. However, for the calculations, the smallest thickness of the air chambers present in these Envelope-Roof-Sections will be taken into account (likely the one of the non-slopped roof). For a sloped Envelope-Roof-Sections the thicknesses to consider for the calculations are the ones taken at the zone where they are shortest, having a tolerance of 30 cm from the edge of the section for the unions (as long as the continuity of the Layers is kept).

The Envelope-Layers have a thickness, a thermal conductivity, a vapor permeability and an order of arrangement, all of which will matter for the Calculation Methods here disclosed. The order of arrangement, considered from the outermost Layer to innermost Layer or vice-versa, may vary as long as the K-Max Condition and the No-Condensation Condition are satisfied, but, for the sake of the calculations, it should be kept constant across all the Envelope-Sections of the same Type, for all the Modules of a given building. The Envelope-Layers may be of the following Types:

(a) Structural Insulated Panels (SIPs), typically comprising an insulating foam core sandwiched between two structural facings such as OSB, plywood, sheet metal, gypsum sheathing, and many other varieties. In the preferred embodiments, SIPs with polyurethane cores and sheet metal or gypsum sheathing are used because of their excellent performance.

(b) Boards of any kind, including gypsum-based boards for walls and ceilings, OSB and plywood, boards, for example for Floor-Sections, and other kinds of boards for support or sheathing (for example Alucobond for some finishes, and hardwood or ceramic tiles for flooring, etc.).

(c) Supporting-Frames, which may include the corresponding Envelope-Section's Aeriated Frame and, in some embodiments other Frames which share the main characteristics (a, b and c) of the Aeriated Frames as defined in this specification, but whose main function may be unrelated to structural support. Instead, they may be added between two Layers to create air chambers or to expand the thickness of existing air chambers.

(d) Sheets. Such as paint films, fabrics, radiant barriers, firestop wraps, vapor barrier sheets, protective coatings and other kinds of thin Layers, whose thicknesses are negligible for calculation purposes, but whose thermal conductivity and or/vapor permeability make their consideration relevant for the calculation.

(e) Insulating-Layers, such as glass wool, Fiberglass, blown-in insulation, foams, etc., whose function may be primarily for thermal insulation or for sound insulation.

(f) Additional-Intervening-Layers: Different embodiments of Envelope-Sections may include combinations of the above-mentioned kinds of Layers, with their possible variations and repetitions, and they may also include other kinds of materials and combinations not listed here. Still, whenever a material is included as a Layer (in the broad sense hereabove described) within an Envelope-Section, and this material has a non-negligible thermal conductivity and or/vapor permeability, it must be considered as an Envelope-Layer and included in the calculations for the K-Max and the No-Condensation Conditions.

Note: Non-intervening Elements may also be added: Different embodiments of Envelope-Sections may further include Non-intervening elements such as non-continuous layers, Non-aeriated Frames, cables, tubes, and structural elements which do not create air cambers and whose thermal conductivity and vapor permeability are negligible for the K-Max and No-Condensation Conditions' calculation purposes. Their inclusion not having an impact in the calculation, they are considered as "Non-intervening" and may be added for a variety of functions (including mere ornamentation), not needing to be considered for the calculations.

Back to FIGS. 5 and 6, they schematically exemplify not only a possible configuration of Envelope-Layers, but also the thermal behavior of the respective Envelope-Sections they illustrate. For FIG. 5, going from the innermost Layer to the outermost Layer (left to right in the figure), the first Layer is a gypsum board 32, then a glass wood Layer 33, a polyethylene vapor barrier sheet 34 applied to a SIP (for example a gypsum-polyurethane Sandwich Panel) 35, an air chamber 36 (actually created by a Supporting-Frame which would be at the same time the Wall-Frame of the Support Structure) and, finally, a second SIP 37, that could be, for example, a metal sheet-polyurethane Sandwich Panel.

Reference number 38 shows the interior temperature as being 18° C., while the exterior temperature is shown with reference number 39, as being −3° C. The curve 40 shows the evolution of the temperature from Layer to Layer of the Envelope-Section. The curve 41 shows the evolution of the dew point temperature Layer to Layer throughout the Envelope-Section. The vertical segment 42 represents the effect that the vapor barrier sheet has in this dew point temperature curve. The fact that, in this figure, the curve 41 is lower at all points than the curve 40 and never touches or crosses it, is a graphical representation of the No-Condensation Condition. (If this example, the Condition would be satisfied, meaning that the risks of superficial and interstitial water condensation in the studied Envelope-Section are minimal). The same concept is replicated in FIG. 6, in which 38 shows the interior temperature, 39 the exterior temperature, 40 the temperature curve and 41 the dew point temperature curve. The horizontal segment 42 represents the effect that the vapor barrier sheet has in this dew point temperature curve, where, as the curve 41 is lower (in this case, more to the right) at all points than the curve 40 and never touches or crosses it, the No-Condensation Condition would also be theoretically satisfied in this example. The Layers in FIG. 6 are, from outermost to innermost: A SIP 37, a truss' sloped beam 43 (that acts as a Supporting-Frame) creating an air chamber 46, a glass wood Layer 33, a structural beam 44 (part of an equally thick Supporting-Frame) and vapor barrier sheet 34 applied to a gypsum suspended celling 45 and defining a second air chamber 47. The thicknesses of the air chambers are measured as follows: air chamber 46 is measured at a line separated at most 30 cm from the beginning edge of the Envelope-Section and air chamber 47 is measured from the gypsum board's 45 upper face (in which the vapor barrier 34 is applied) to the Envelope-Roof-Frame 44's Outer Face.

FIG. 7 shows a possible embodiment of a union between an Envelope-Wall-Section 48 and an Envelope-Floor-Section 49. The columns 44*a* and beams 44*b* that are part of the Support-Structure of the illustrated Module, give support to the mentioned Envelope-Sections forming air chambers, 36 for the wall and 51 for the floor. The Envelope-Layers for the Envelope-Wall-Section 48 of this particular embodiment include an exterior sheathing Layer 50 (for example, Alucobond), and a metal sheet-polyurethane Sandwich Panel 37 for the Outer-Wall-Section, and a gypsum-polyurethane Sandwich Panel 35, a glass wool insulating Layer 33 and a gypsum board 32 for the Inner-Wall-Section. Reference number 34 marks where the vapor barrier sheet would be in this example. The Envelope-Layers for the Envelope-Floor-Section 49 includes, from bottom to top, a first OSB board 52*a*, coupled to the Floor-Frame of the Support Structure, then a Supporting-Frame 53 made, in this case, from a plurality of parallel "C" profiles coupled to said board, a second OSB board 52*b* coupled on top of the Supporting-Frame 53, a metal sheet-polyurethane Sandwich Panel 37 over it, then a third OSB board 52*c* and lastly a hardwood floor 54. Spaced perforations may be added to the C-Profiles, the structural beams 44*b*, or both, to ensure the unobstructed air flow within the air chamber 51. These Layers may be replaced—in other embodiments—by other Layers, with different materials, functions, quantities and order of arrangement, as long as the Conditions disclosed in this specification are still satisfied.

FIG. 7 also shows a foundation and a possible way in which the Modules may be secured to said foundation. This is only an example and may be modified in other embodiments to an immense variety of options that serve the same purpose. In this example, the first step consists on the site's preparation by digging a 50 cm deep hole in the terrain of the size and shape of the projected home and removing at least 30 additional centimeters of soil per side, outside of the building perimeter. Subsequently, selected soil 58 is evenly poured over the bottom of the hole (approximately 20 cm deep), and the forms 57 are laid throughout the perimeter of where the Modules will be placed. Forms 57 should be tight, rigid and strong (for example, made from scrap lumber). Steel reinforcing bars 56 are then positioned as required by the size and characteristics of the project, and the first stage of concrete 59 (to the inside of the forms 57) is poured. An arrangement of L-Shaped anchor bolts 60 is then added, before the concrete dries out, having a size and separation matching the size and separation of a series of holes previously made for this purpose on the Floor-Frames of the Modules to be installed. Once the concrete is dry, the Modules are put in their place with all the anchor bolts going through the respective holes and adjusted with nuts. Finally, a second stage of concrete 61 is poured to the outside of the forms 57 to complete the foundation. The soil around the foundation (55) is then finished to match it to the level of the terrain.

FIG. 8 shows a possible embodiment of a union between an Envelope-Wall-Section 48 and an Envelope-Roof-Section 62. The columns 44*a* and beams 44*b* that are part of the Support-Structure of the illustrated Module, give support to the mentioned Envelope-Sections forming air chambers 36 for the wall and 46 for the roof. The Envelope-Layers for the Envelope-Wall-Section of this particular embodiment include an exterior sheathing Layer 50 (for example, Alucobond), and a metal sheet-polyurethane Sandwich Panel 37 for the Outer-Wall-Section 48*a*, and a gypsum-polyurethane Sandwich Panel 35, a glass wool insulating Layer 33 and a gypsum board 32 for the Inner-Wall-Section 48*b*. Reference number 34 marks where the vapor barrier sheet of the wall would be in this example. The Envelope-Layers for the Envelope-Roof-Section 62 include, from top to bottom, a metal sheet-polyurethane Sandwich Panel 37 supported over a sloped truss 43, and a suspended ceiling system 45 comprising a gypsum board which has applied to it a vapor barrier sheet 34. These Layers may be replaced—in other embodiments—by other Layers, with different materials, functions, quantities and order of arrangement, if the Conditions disclosed in this specification are still satisfied.

Figure 9:
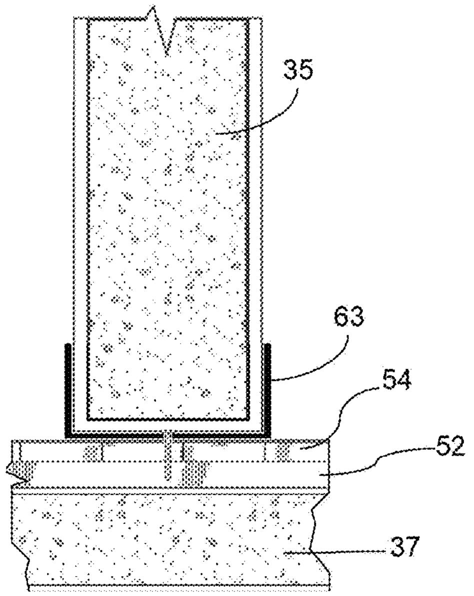
FIG. 9 is a side sectional view of an embodiment of the union between an internal SIP wall and a Floor-Section, in accordance with the present invention.
Figure 10:
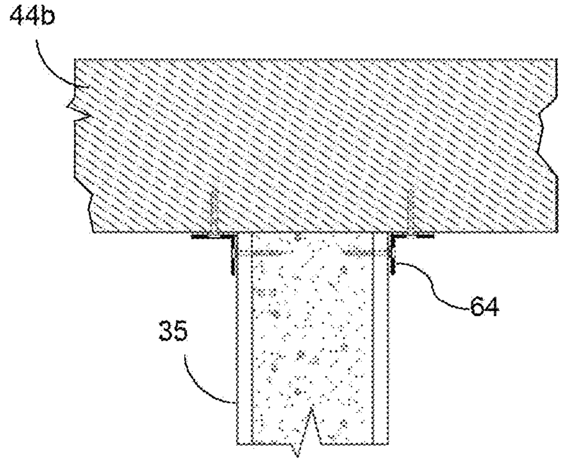
FIG. 10 is a side sectional view of an embodiment of the union between an internal SIP wall and a structural beam, in accordance with the present invention.
Figure 11:
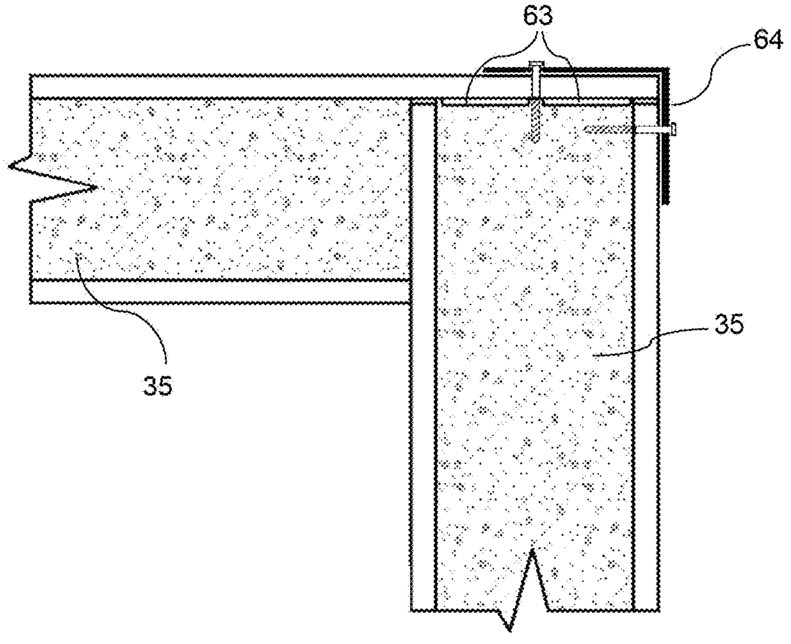
FIG. 11 is a top sectional view of an embodiment of the union between two internal SIP walls, in accordance with the present invention.

FIG. 9 shows a possible embodiment of the union between an internal SIP wall 35 and a Floor-Section including a SIP 37, an OSB board 52 and a hardwood floor 54. The union is made through a "U" shaped profile 63. FIG. 10 shows a possible embodiment of the union between an internal SIP wall 35 and a structural beam 44*b*. The union is made through the use of two "L" shaped profiles 64. FIG. 11 shows a possible embodiment of the union between two internal SIP walls 35. The union is made through an "L" shaped profile 64 and two "U" shaped profiles 63.

Figure 12A:
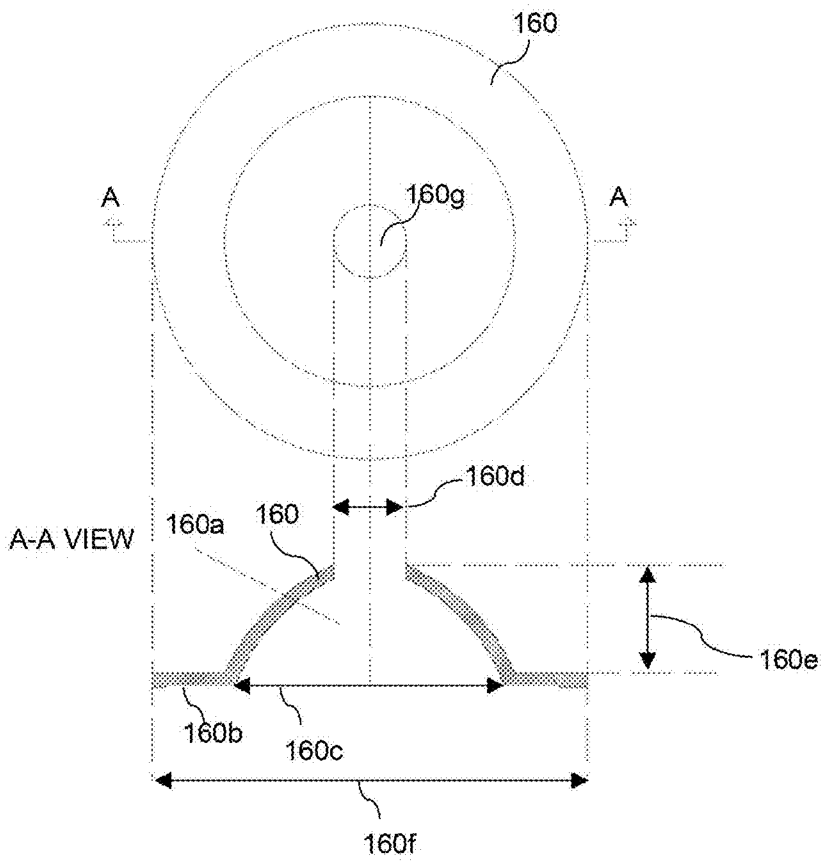
FIG. 12*a* is a top view and a sectional side view of an embodiment of a Thermal Bridge Breakage capsule in accordance with the present invention.
Figure 12B:
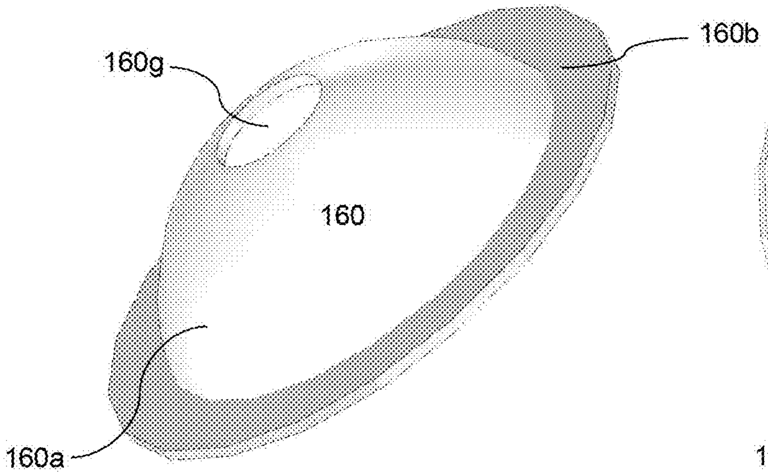
FIG. 12*b* is a top perspective view of an embodiment of a Thermal Bridge Breakage capsule in accordance with the present invention.
Figure 12C:
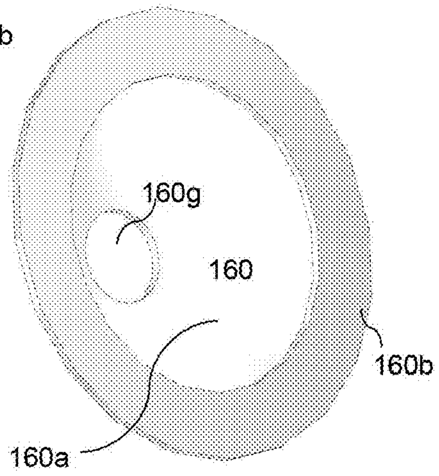
FIG. 12*c* is a bottom perspective view of an embodiment of a Thermal Bridge Breakage capsule in accordance with the present invention.

FIG. 12*a* shows an embodiment a Thermal Bridge Breakage capsule 160 in accordance with the present invention. On the upper part of the figure a top view is shown while in the bottom part a side-sectional view of the capsule 160 can be seen. This capsule, used to break thermal bridges in the envelope sections, is formed by a hemispherical cap 160*a* filled with a high insulation material such as polyurethane foam or plastic insulation. The spherical cap 160*a* has an outer diameter 160*c* (in the preferred embodiment, this diameter is of around 80 mm) and a height 160*e* (in the preferred embodiment, this height is of around 30 mm). The hemispherical cap 160*a* is made of PVC material or similar, and has a hole 160*g* in the middle, and a flat plaque 160*b* around the hemispherical cap 160*a* to fix the Thermal Bridge Breakage capsule 160 to the structure with high adherence glue. This flat plaque can have a round shape, having an outer diameter 160*f* of, for example, 120 mm in the preferred embodiment. Also in the preferred embodiment, the hemispherical cap 160*a* and the flat plaque 160*b* are manufactured as a single piece, with the shape shown in FIGS. 12*b* and 12*c*, although in other embodiments the hemispherical cap 160*a* and the flat plaque 160*b* can be manufactured as separate pieces and then glued together, which is in principle less convenient but still a valid way to do it. The hole 160*g* has an inner diameter, 160*d* (in the preferred embodiment, this inner diameter is of around 20 mm).

Figure 13:
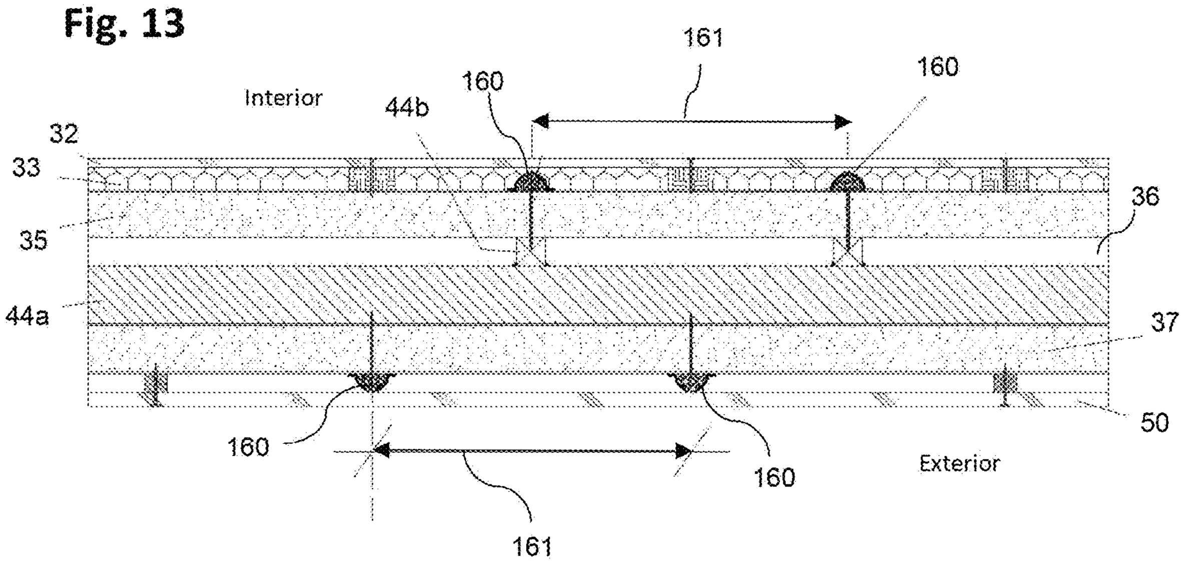
FIG. 13 is a top sectional view of an embodiment of the longitudinal union between two Envelope-Wall-Sections each pertaining to one of two adjacent Modules, in accordance with the present invention, including thermal Bridge Breakage capsules.

FIG. 13 shows an embodiment of an Envelope-Wall-Section having Thermal Bridge Breakage capsules 160, separated by a distance 161, in order to break the thermal bridges. The Support-Structure of this illustrative Module is made of columns 44*a* and beams 44*b*. The wall section includes an exterior sheathing Layer 50 (for example, Alucobond), and a metal sheet-polyurethane Sandwich Panel 37 for the Outer-Wall-Section, and a gypsum-polyurethane Sandwich Panel 35, a glass wool insulating Layer 33 and a gypsum board 32 for the Inner-Wall-Section, forming an air chamber 36. In order to ensure both structural and energy efficiency issues, it is determined that the critical distance "L" of the 161 distances between fixings or between thermal bridges, both for ceilings and for walls and floors, must be:

$$0.60\text{ m} <= L <= 1.40\text{ m} \quad (3)$$

Figure 14:
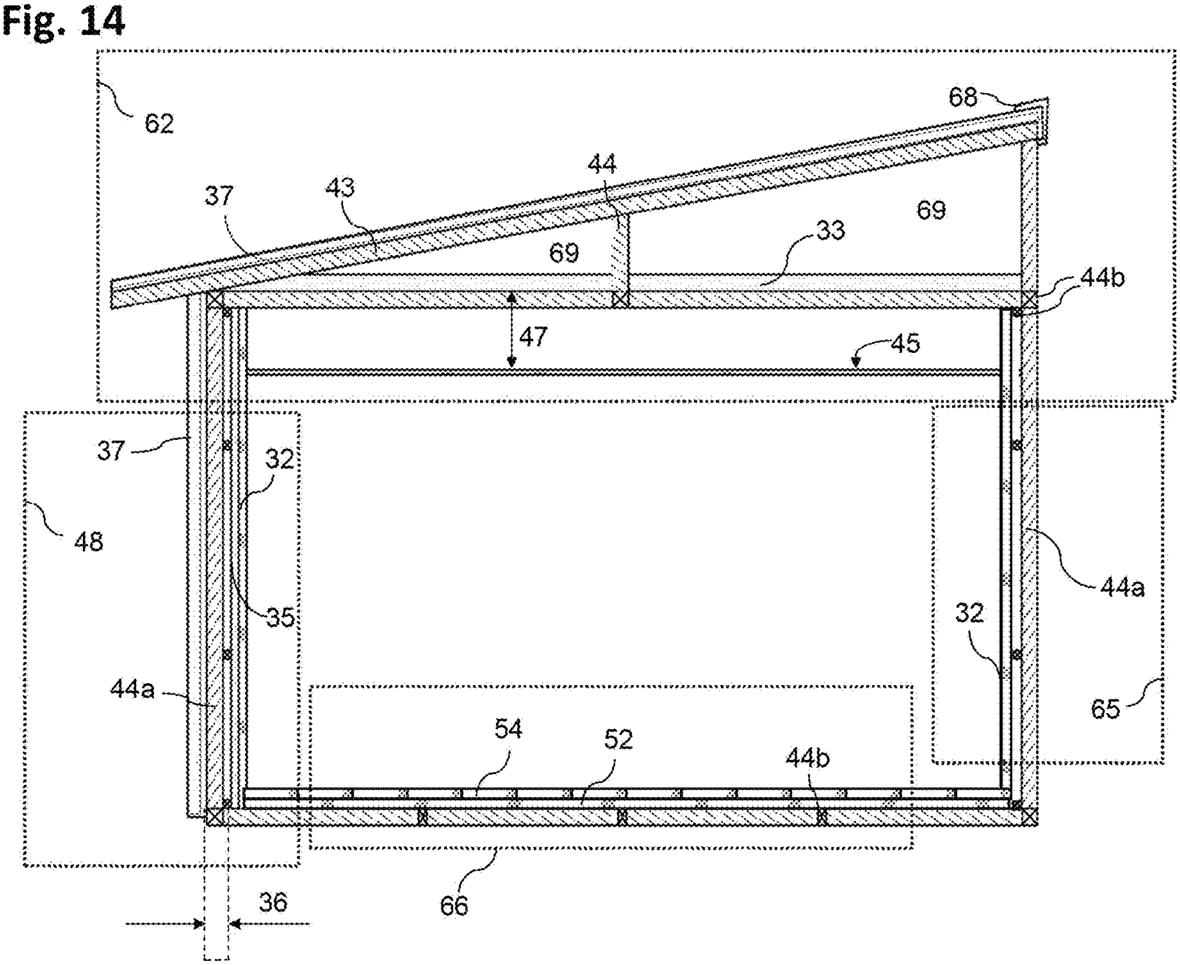
FIG. 14 is a side sectional elevation view of an embodiment of a Module in accordance with the present invention showing a slopped Envelope-Roof-Section, an Envelope-Wall-Section, a Non-envelope-Wall-Section and a Non-envelope-Floor-Section.

FIG. 14 shows an embodiment of a Module having an Envelope-Wall-Section 48, an Envelope-Roof-Section 62, a Non-envelope-Wall Section 65 and a Non-envelope-Floor section 66. A possible reason for a layout as the one here shown is that the Module is purposed to be a second floor of a two-story house, and to have another Module adjacent to it through the Non-envelope-Wall section 65. The Support-Structure of this illustrative Module is made of columns 44*a*, beams 44*b*, sloped truss members 43 and some other additional framing members 44 to support the truss. The main difference between the Envelope-Wall-Section 48 and the Non-envelope-Wall Section 65 is that the first one includes an air chamber 36, and several Envelope-Layers, while the second one only includes, in this example, a gypsum board 32 and is not subject to the conditions set out by the Calculation Methods. The Envelope-Layers for the Envelope-Wall-Section 48 of this particular embodiment include a metal sheet-polyurethane Sandwich Panel 37 for the Outer-Wall-Section, and a gypsum-polyurethane Sandwich Panel 35 and a gypsum board 32 for the Inner-Wall-Section. The Envelope-Layers for the Envelope-Roof-Section 62 includes, from top to bottom, a metal sheet-polyurethane Sandwich Panel 37-supported over a sloped truss 43, a glass wool insulating Layer 33 and a suspended ceiling 45 (which is made of a gypsum board), forming an air chamber 47. These Layers may be replaced—in other embodiments—by other Layers, with different materials, functions, quantities and order of arrangement, if the Conditions disclosed in this specification are still satisfied. As the spaces 69 are filled by air, the same concept explained in FIG. 6 would apply for the measurement of the thickness of the other air chamber contained in this roof section, for the application of the Calculation Methods. The roof-wall corner union is sealed by an angled profile 68. The Non-envelope-Floor section 66 includes an OSB board 52 and a hardwood floor 54.

Figure 15A:
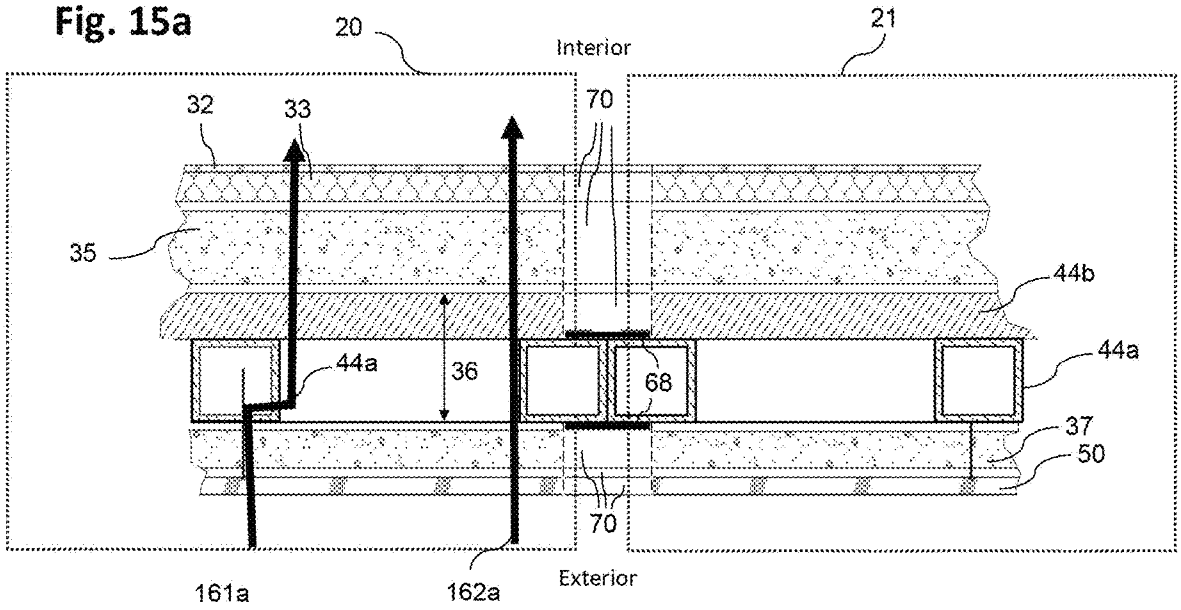
FIG. 15*a* is a top sectional view of an embodiment of the longitudinal union between two Envelope-Wall-Sections each pertaining to one of two adjacent Modules, in accordance with the present invention.
Figure 15B:
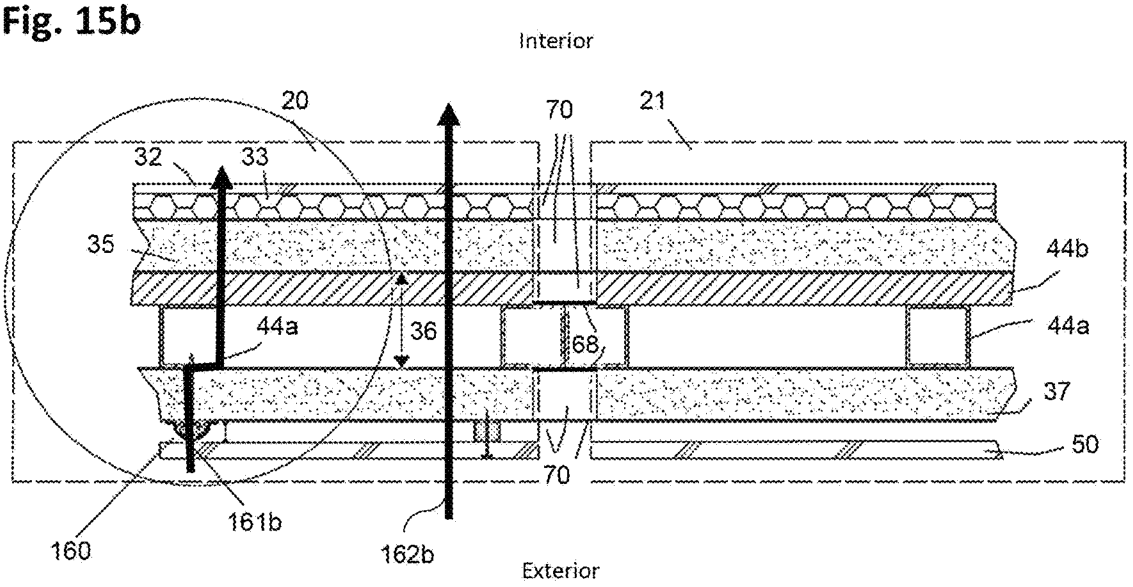
FIG. 15*b* is a top sectional view of an embodiment of the longitudinal union between two Envelope-Wall-Sections each pertaining to one of two adjacent Modules, in accordance with the present invention, including thermal Bridge Breakage capsules.

FIGS. 15*a* and 15*b* show two embodiments of the longitudinal union between two Envelope-Wall-Sections each pertaining to one of two adjacent Modules, 20 and 21. In both of these figures, the columns 44*a* and beams 44*b* that are part of the Support-Structure of the illustrated Modules, give support to the mentioned Envelope-Wall-Sections. The Envelope-Layers for the Envelope-Wall-Sections of this particular embodiment include an exterior sheathing Layer 50 (for example, Alucobond), and a metal sheet-polyurethane Sandwich Panel 37 for the Outer-Wall-Section, and a gypsum-polyurethane Sandwich Panel 35, a glass wool insulating Layer 33 and a gypsum board 32 for the Inner-Wall-Section, forming an air chamber 36. To join the Modules, a column 44*a* of one of the Modules is situated side by side to a column of the other Module and coupled together with the use of two flat metal bars 68. A plurality of Layers 70 is afterwards completed with their corresponding materials at the construction's site once the Modules are fixed in their definitive positions. FIG. 15*a* shows the thermal bridges that exist, due to the construction process, both to be able to link adjacent modules (20) and (21), and to be able to fix the outer and inner panels that are part of the envelope corresponding to each module. Thermal Bridges are generated there due to the process of linkage and fixation of panels (construction process). Analyzing column 44*a* of FIG. 15*a*, where the metal fixing used to link the outer panel 37 to it can be seen, the Thermal Bridge is shown in this case. The energy stream of the thermal bridge 161*a* can be seen and also that of the opaque wall 162*a*. In FIG. 15*a* there are no Thermal Bridge Breakage devices while in FIG. 15*b* a Thermal Bridge Breakage capsule 160 is shown. This creates a different heat flow 161*b*, where less heat is lost when compared to the thermal bridge heat flow 161*a* of FIG. 15*a*.

Figure 16:
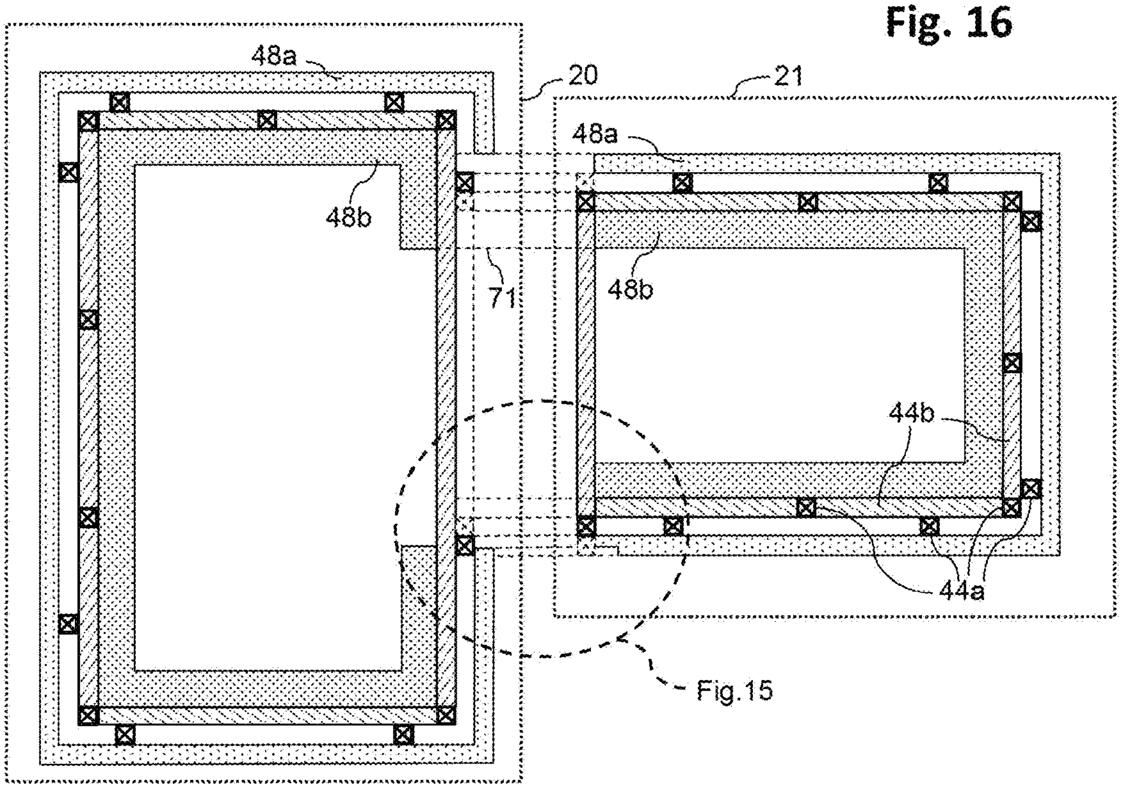
FIG. 16 is a top sectional view of an embodiment of the union between two adjacent Modules in accordance with the present invention.
Figure 17:
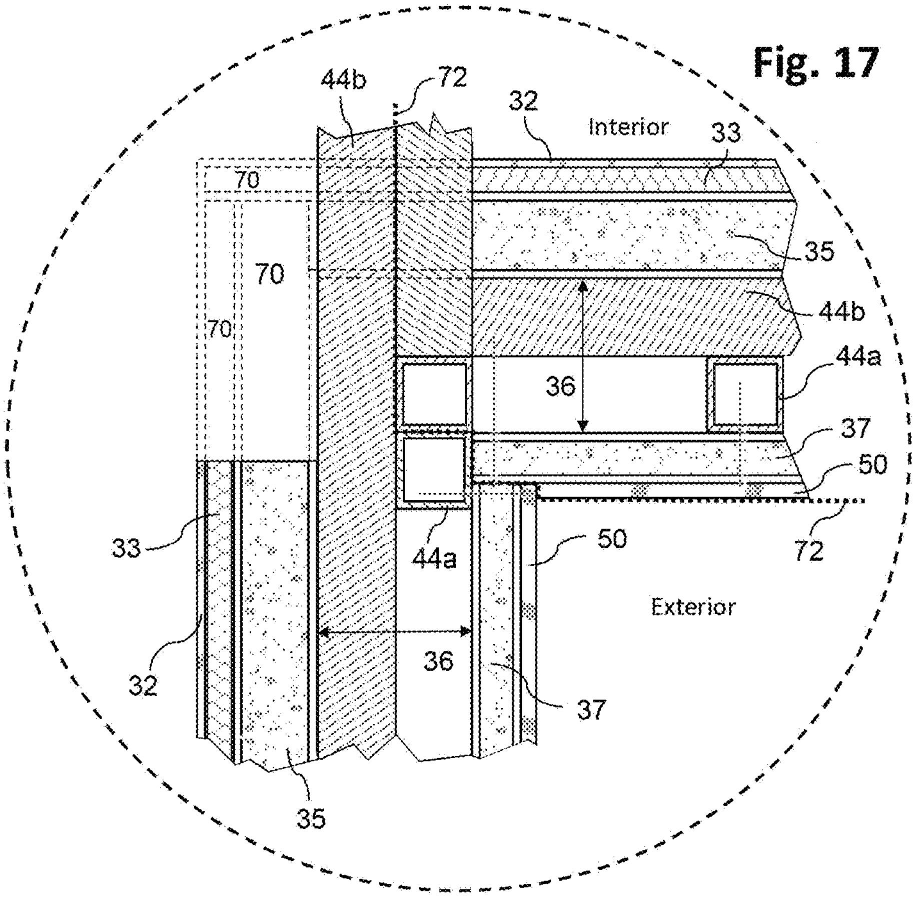
FIG. 17 is a partial view showing in more detail a perpendicular union between two Envelope-Wall-Sections each pertaining to one of the two adjacent Modules of FIG. 14.

FIGS. 16 and 17 show an embodiment of the perpendicular union between two Envelope-Wall-Sections each pertaining to one of two adjacent Modules, 20 and 21. FIG. 14 is a general view in which the outer wall section 48*a* and the inner wall section 48*b* are simplified for a better visualization of the relative positions of the Modules involved. The beams 44*b* and columns 44*a* of both Modules are shown. The dashed lines 71 show where the relevant beams and columns of the Modules would be positioned once they are joined together. FIG. 15 shows in more detail the Envelope-Layers of one of the unions between these two illustrative Modules and how they are joined together. The Envelope-Layers for the Envelope-Wall-Section of this particular embodiment include an exterior sheathing Layer 50 (for example, Alucobond), and a metal sheet-polyurethane Sandwich panel 37 for the Outer-Wall-Section, and a gypsum-polyurethane Sandwich Panel 35, a glass wool insulating Layer 33 and a gypsum board 32 for the Inner-Wall-Section, forming an air chamber 36. Beams 44*b* are shown. To join the Modules, a column 44*a* of one of the Modules is situated side by side to a column of the other Module and coupled together. A plurality of Layers 70 is afterwards completed with their corresponding materials at the construction's site, once the Modules are fixed in their definitive positions. The dotted line 72 marks the limit between the two original Modules, for further clarity.

Figure 18:
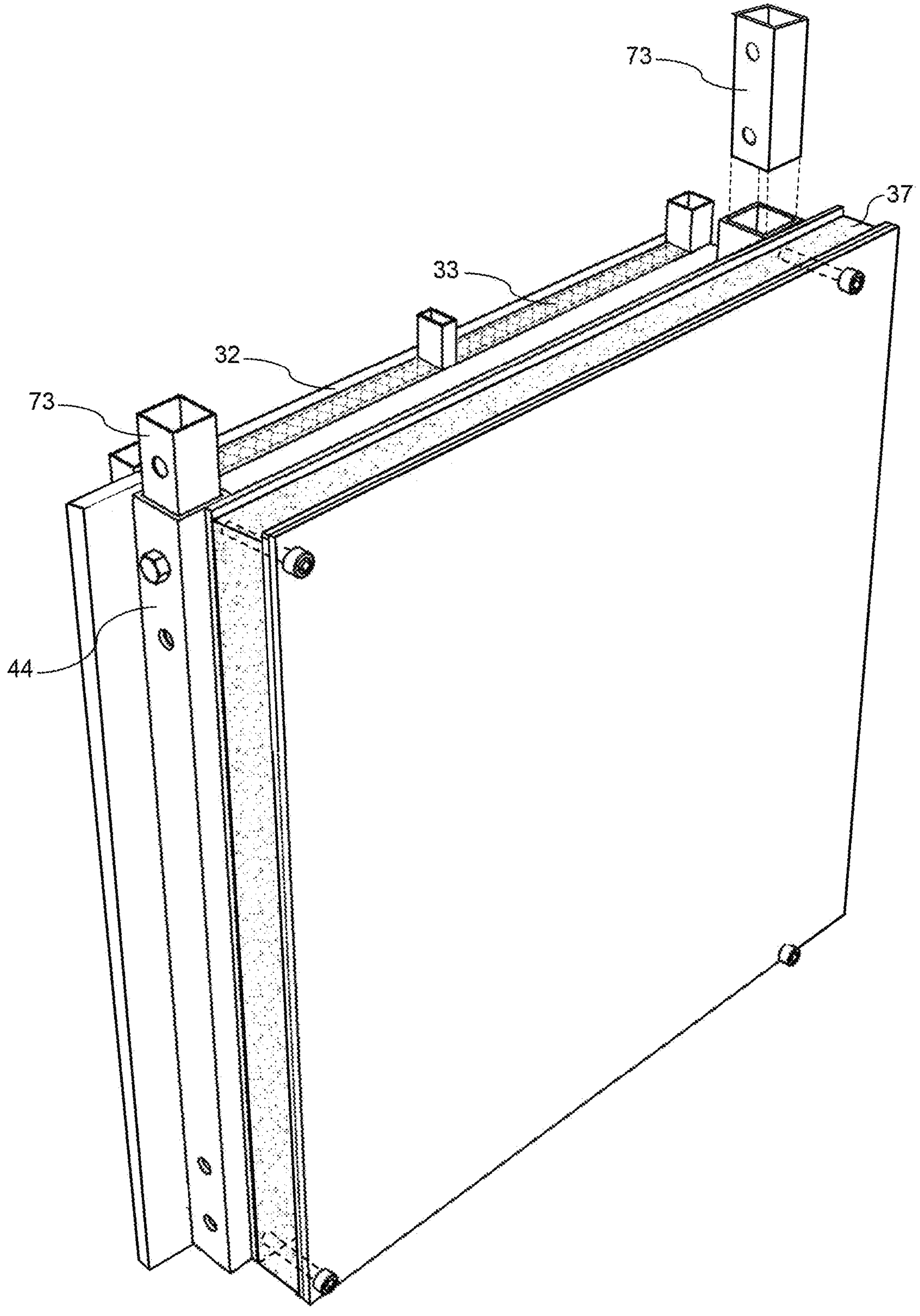
FIG. 18 is a perspective view of an embodiment of a wall panel in accordance with the present invention.

FIG. 18 shows an embodiment of a prefabricated modular panel for an Envelope-Outer-Wall-Section, conceived for its application as a part of a prefabricated modular panel system. This panel may be designed to be adapted for its installation to any Aeriated Support Structure. A panel according to this invention should contain the Envelope-Layers established by the methods here described and should couple to the Support Structure and to its adjacent panels to cover the totality of the Envelope-Section it belongs to. Similarly to this panel, other panels may be used to cover the inner wall section, roof section and floor section of the house or building being constructed. This illustrative panel includes framing members 44, a SIP 37, a gypsum board 32 and a glass wool insulating Layer 33. To join a panel to the next one, perforated square section parts 73, screws and nuts may be used.

Calculation Methods

FIGS. 19-31 relate to the Calculation Methods for the relevant parameters of the Envelope-Layers. These methods include the "K-Max Method" to find a configuration of Layers that satisfies the "K-Max Condition", the "No-Condensation Method" to find a configuration of Layers that satisfies the "No-Condensation Condition" and the "Optimization Method" to optimize these parameters for a minimum K-Value, a minimum total cost or other objectives set by the User. The methods are to be applied by a "User", understanding by "User" any individual or organization interested in constructing a Zero-Energy home or building as per this specification, any part thereof, and/or in providing any product or service related to the claimed invention. The K-Max and the No-Condensation Conditions, as herein defined, are requisites for the configuration of the Envelope-Layers in any Zero-Energy home or building in accordance with the present invention. However, the specific methods here disclosed for their calculation are merely illustrative and a wide array of variations to these methods may be applied, that would still give as a result values serving the same general purpose, variations which are included in spirit and scope of the invention as defined by the appended claims. Other embodiments of these methods include manual operations and corresponding computer systems, apparatus, and computer programs recorded on one or more computer storage devices, each configured to perform the actions of the methods. For every table and sub-table presented, other measurement units different than the herein disclosed may be used with the corresponding conversions and adjustments.

Figure 19:
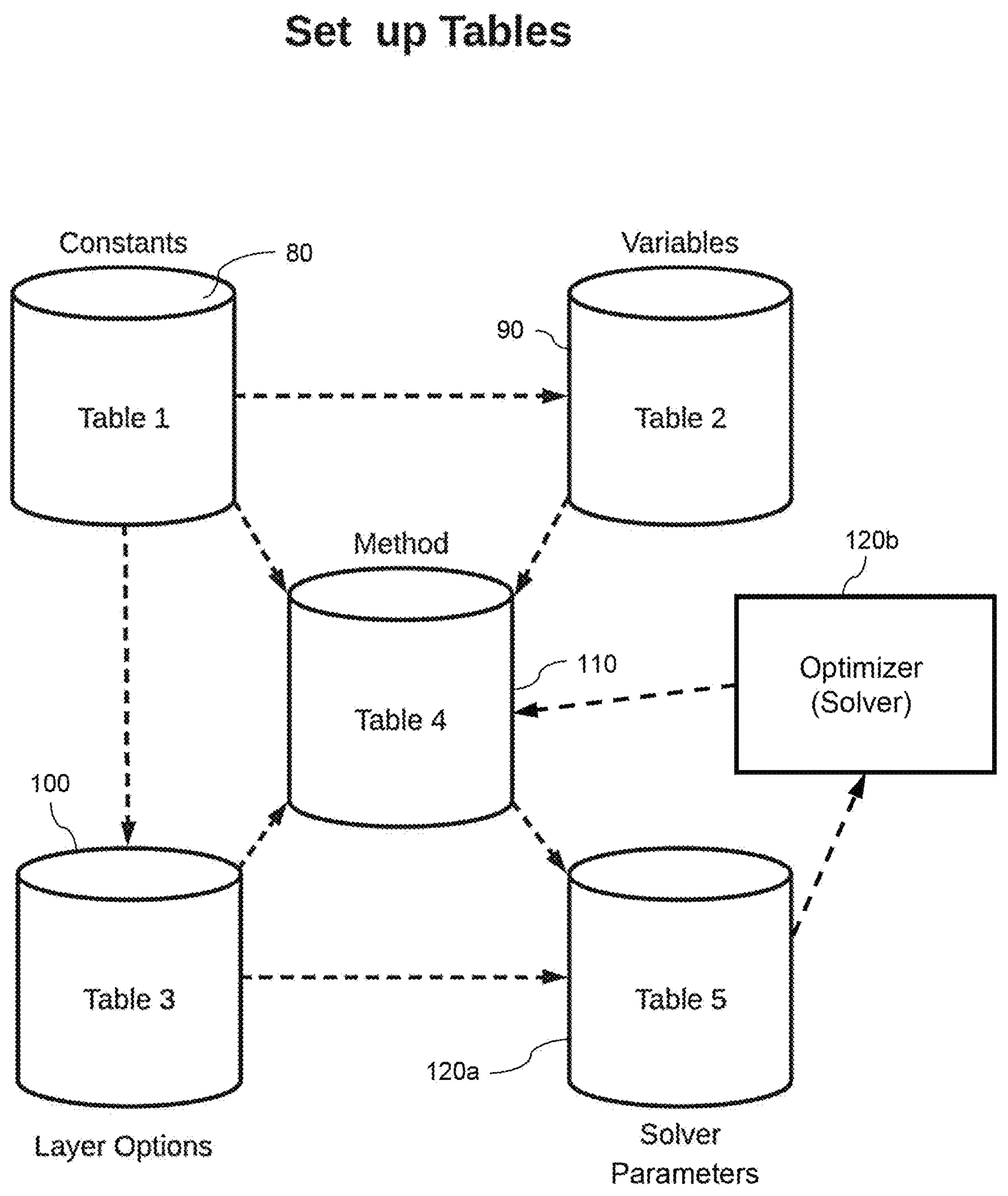
FIG. 19 is a block diagram showing the interaction between the different databases and processes used in an embodiment of the Calculation Methods in accordance with the present invention.

FIG. 19 shows the main tables used in one possible embodiment of the Calculation Methods. These tables may represent excel worksheets, csv files, text files, MySQL tables or any kind of database capable of storing the provided information in a suitable way for its processing as disclosed. Even if the use of computers for these methods is preferred, some or all of the tables may also be generated through the manual registration of the information and some or all of the methods may be manually applied. The tables used may have, in other embodiments, different, fewer, or additional fields, rows and columns, and may be arranged in other ways (use fewer tables, for example, if some of the tables here disclosed are joined together in one). The disclosed arrangement of tables—to be used in Excel with the possibility of applying Microsoft's Excel Solver for the Optimization Method—is preferred. Reference number 80 designates Table 1, which is further disclosed in FIGS. 18*a* and 18*b*. Table 1 stores the values of the constants needed to apply the disclosed methods. These constants are provided by this specification but may be altered for other embodiments in the ways that will be disclosed later in this specification. Reference number 90 designates Table 2, which is further disclosed in FIG. 19. Table 2 stores the values of the variables, related to each specific project, entered by the user for the application of the disclosed methods. More variables than the ones here disclosed may be added to other embodiments, as well as variations of the variables here disclosed that will still serve the same general purpose. Reference number 100 designates Table 3, which is further disclosed in FIG. 21. Table 3 stores the values of the relevant parameters of the different materials and components of the Envelope-Layers needed for the application of the disclosed methods. These values may be obtained from up-to-date commercial catalogs available to the User, and they may vary for each different project. Additional parameters to the ones here disclosed may be recorded in other embodiments, as well as variations of the parameters here disclosed that will still serve the same general purpose. Reference number 110 designates Table 4, which is further disclosed in FIG. 23. Table 4 is the main Table for the application of the Calculation Methods, putting together relevant information from the other tables, and storing some of the results of the calculations performed by these methods. The layout of this table, as well as the rows and columns included in it, may be modified in other embodiments as long as the variations still serve the same general purpose. Reference number 120*a* designates Table 5, which is further disclosed in FIG.

27. Table 5 stores the values of the parameters that will be used for the Optimization Process 120*b*. These parameters, which include the objective values to be optimized and the constraints to apply in the Optimization Method, are based on the other tables and, if the other tables are modified in other embodiments, these parameters may vary too. The Optimization Method is separated from the K-Max and the No-Condensation Methods and all said methods may be used independently from one another. The dotted arrows in FIGS. 17-28 represent the exchange of information to between tables and processes. The dotted arrows in FIG. 17 generally represent the flow of information between Tables 1-5 and the Optimization Process 120*b*. The following tables and flowcharts will specify in more detail the nature of these interactions.

FIGS. 20*a* and 20*b* show a possible layout for an embodiment of Table 1 (80), which is the table used for storing the constants used by the Calculation Methods. Table 1, in this embodiment, is separated in three Sub-tables: Sub-table 1 (81) which stores the maximum values of the K-values allowable by the K-Max Method depending on the temperature of the projected location of the building, Sub-table 2 (82), which stores the information related to the superficial resistances of each Envelope-Section, and Sub-table 3 (83), which stores the information related to the air chambers.

In FIG. 20*a*, Sub-table 1 (81) has the following columns:

Column 81*a*, "Exterior temperature" measured in ° C. This temperature may also be measured in ° F. or any other unit for temperature, with the corresponding conversions and adjustments. In this column, the minimum and maximum annual temperatures for the location of the Building will be searched. The location can be as specific as the city, town, or zip-code or latitude-longitude coordinates of the place where a specific building will be located, or as general as a bio-climatic zone or a whole country. In any case, the maximum and minimum annual temperatures for the geographic area considered are applied.

Column 81*b*, "KMAX(WS)", is the Maximum K-Value allowable for the Envelope-Wall-Section; Column 81*c*, "KMAX(RS)", is the Maximum K-Value allowable for the Envelope-Roof-Section; and Column 81*d*, "KMAX(FS)", is the Maximum K-Value allowable for the Envelope-Floor-Section of the home or building, all measured in W/m2 K. This demanding standard, of the inventor's own development, reflects a reasonable goal to achieve affordable Zero-Energy buildings with the use of the materials, designs and calculations herein disclosed. As will be shown later, the maximum K-value desirable for a given project may be defined by the User as any value lower to the maximum allowable values disclosed by this table. However, no values higher to them should be permissible, except for a tolerance of at most 20% of the disclosed maximum allowable values, since more than that would negatively impact the energy-efficiency of the Building Envelope to an unacceptable degree. Alternatives to K-values and equivalents to the proposed measurement units may be applied with the corresponding conversions and adjustments. These values of K-Max (81*b*, 81*c* and 81*d*) correspond to each value of exterior temperature (81*a*) of the table.

In FIG. 20*b*, Sub-table 2 (82) has the following columns:

Column 82*a*, "Layer-Type", has two Layer-Types, ESR (that stands for "Exterior Superficial Resistance", as stated in column 82*b*, "Concept"), and ISR (that stands for "Interior Superficial Resistance", as also stated in column 82*b*). These represent, respectively, the values to be used for the integration of the concepts of exterior and interior superficial resistances of each of the Envelope-Sections to be taken into account for the calculations. For this embodiment, the ESR and the ISR are treated as the first and last Envelope-Layers of each section, applying for them the values contained in this table. The only actual values that this table contains are the ones corresponding to Column 82*e*, "R", in which the thermal resistance of each of these "Layers", measured in m2k/w is stated. The other columns are filled with "n/a" meaning that for these "Layers" these concepts are not to be applied. These concepts are added as a way of normalizing the information because they are used in the other Layers:

Column 82*c*, "Th", is the thickness of the Layer (measured in m)

Column 82*d*, "λ", is the thermal conductivity of the Layer (measured in W/mk)

Column 82*f*, "δ", is the vapor permeability of the Layer (measured in g/m h kpa)

Column 82*g*, is the surface area of the Envelope-Section, measured in m2

Column 82*h*, "Option", indicated by an integer number, is a number representing which of the options for this particular Layer, of the ones that can be found in Table 3

(100) is the one to be applied for this Layer.

As previously stated, for the two "Layer-Types" object of this sub-table, values for columns 82*c-h* are non-applicable nor needed for the calculations. Other embodiments include other ways of integrating the consideration of the interior and exterior superficial resistances into the calculations. Other parameters, variables and units may be used to this end, with their corresponding conversions and adjustments.

Sub-table 3 (83) has the following columns:

Column 83*a*, "Option", indicated by an integer number, is a number designating which one of the options for the current Layer the corresponding row will define. Each option will be defined by a numeral starting with "1". For this embodiment, 7 different options for each of the air chambers are suggested, but these numbers may vary in other embodiments, as long as the air chambers are properly considered in the calculations.

Column 83*b*, "Envelope-Section", represents to which of the Envelope-Sections the air chamber in consideration pertains (Envelope-Wall-Section, Envelope-Roof-Section or Envelope-Floor-Section).

Column 83*c*, "Layer-Type", is a letter of the alphabet representing the type of Layer the row designates. In this sub-table, the only two Types of Layers used are "G" (for the Envelope-Wall-Section air chambers) and "H" (for the Envelope-Roof-Section and Envelope-Floor-Section air chambers).

Column 83*d*, "Concept", simply states the concept of these Layers (all of them are "air chambers") It is easy to see how some of these columns are only for illustrative purposes of a particular embodiment and may be omitted or modified in other embodiments. The letters for identifying a given Envelope-Layer, for example, are merely conventional and any other convention may as well be used.

Column 83*e*, "Th", is the thickness of the Layer (measured in m)

For this embodiment the thickness ranges to be considered are: 1—

0,005 m to 0.009 m

2—0.010 m to 0.019 m

3—0.020 m to 0.049 m

4—0.050 m to 0.099 m

5—0.100 m to 0.149 m

6—0.15 m to 0.199 m

7—0.200 m to 2 m

These thicknesses were chosen for consideration because of the relevant values they provide for the Calculation Methods. However, other thicknesses, other ranges, and other measurement units may be used with the corresponding conversions and adjustments.

Column 83*f*, "R", is the thermal resistance of the Layer (measured in m2k/w)

Column 83*g*, "λ", is the thermal conductivity of the Layer (measured in W/mk)

Column 83*h*, "δ", is the vapor permeability of the Layer (measured in g/m h kpa)

The values of columns 83*f-h* for air chambers are well known in the field of the invention, and any equivalent thereof may be used as long as the inclusion of the air chambers and their impact in the thermal and condensation performance of the Building Envelope are properly considered in the Calculation Methods.

In FIG. 21, Table 2 (90) has the following columns:

Column 90*a*, "Concept", states in few words the main idea what each variable represents, while Column 90*b*, "Variable" states the alphanumerical code used to identify each of the variables.

Column 90*c*, "Value", is the value that the User assigns for each variable, which may be re-entered for each different project. These values are expressed in the units of measurement stated in Column 90*d*, "Unit".

The variables to be defined by the User may vary from embodiment to embodiment, as also the way of executing these inputs may vary too. The values may be typed directly in the corresponding cells, as in the case of an excel file, or they may be entered through an online or offline form, dialogue box, imported from a file, etc. The variables used in the shown embodiment are:

Max Temperature (Tmax), is the maximum annual temperature at the projected location of the building.

Min Temperature (Tmin), is the minimum annual temperature at the projected location of the building.

Interior Relative Humidity (IRH) is the ideal relative humidity expected to have inside of the building for health and comfort.

Exterior Relative Humidity (ERH) is highest annual exterior relative humidity at the projected location of the building.

Wall Section's Surface Area, S(WS), are the total square meters of surface that the whole Envelope-Wall-Section of the building is projected to have (counted only once, and valid for all the Intervening-Layers).

Roof Section's Surface Area, S(RS), are the total square meters of surface that the whole Envelope-Roof-Section of the building is projected to have (counted only once, and valid for all the Intervening-Layers).

Floor Section's Surface Area, S(FS), are the total square meters of surface that the whole Envelope-Floor-Section of the building is projected to have (counted only once, and valid for all the Intervening-Layers).

Interior Temperature Goal, (ITG), is the ideal interior temperature expected to have inside of the building for health and comfort.

Max K desirable for Wall Section, Kmax (WS), is the maximum K-value that the user is willing to accept for the Envelope-Wall-Section This may be entered manually based on any Standards that the User is interested in complying with. Max K desirable for Roof Section, Kmax (RS), is the maximum K-value that the user is willing to accept for the Envelope-Roof-Section This may be entered manually based on any Standards that the User is interested in complying with.

Max K desirable for Floor Section, Kmax (FS), is the maximum K-value that the user is willing to accept for the Envelope-Floor-Section This may be entered manually based on any Standards that the User is interested in complying with.

Figure 22:
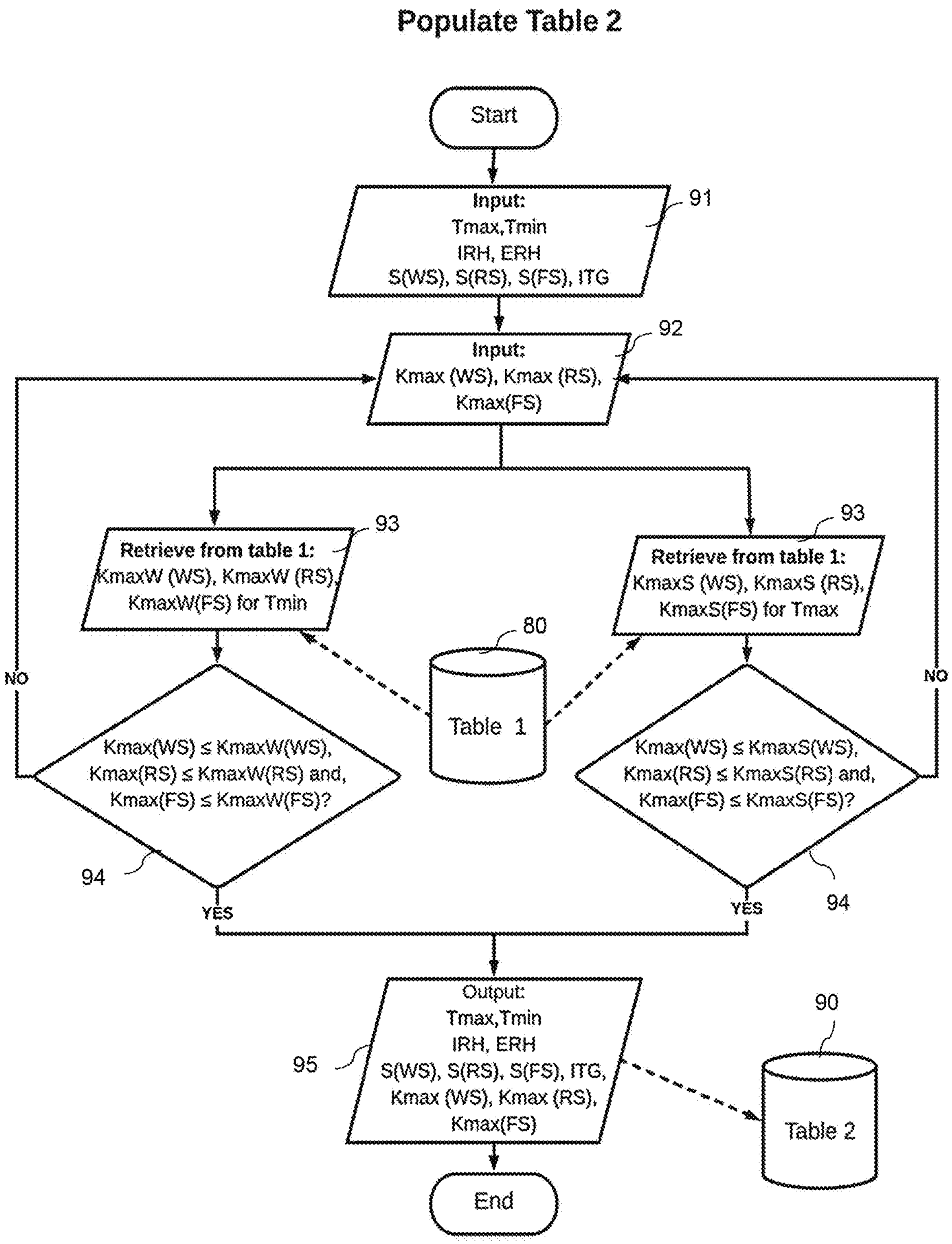
FIG. 22 is a flow chart showing the steps for populating Table two in an illustrative embodiment of the Calculation Methods in accordance with the present invention.

The values for these variables shown in the table are only examples of values that could reasonably be entered by the User in a possible embodiment, for illustrative purposes. FIG. 22 illustrates a possible process in which the values of the variables of Table 2 (90) could be entered by the user. Tmax, Tmin, ERH, IRH, S(WS), S(FS), S(RS) and ITG are entered in step 91, for example by typing the values directly in the corresponding cells, as in the case of an excel file, or entering them through an online or offline form, dialogue box, importing them from a file, etc. The same possibilities, and other conceivable alternatives, are applicable for every input in these methods. Kmax (WS), Kmax (RS), and Kmax (FS) are entered in step 92. These values are the maximum desirable K-values as defined by the User, and they are to be compared to the maximum allowable values for the K-values of each of the Envelope-Sections obtained from Table 1 (80) for both winter and summer conditions. Step 93 retrieves from Table 1 the K-values corresponding both to the Tmax and the Tmin just entered in step 91. This may be achieved, in the case of an excel file, through the application of the VLOOKUP function for said entered temperatures in Table 1, providing as a result the corresponding maximum allowable K-values for the wall, roof and floor sections.

These K-values are compared in step 94 to the corresponding maximum desirable K-values previously entered by the user in step 92. If all the desirable values entered in step 92 are less than or equal to the maximum values allowed by Table 1 (80) and obtained in step 93, then the values are accepted and the values of all the variables entered in steps 91 and 92 are submitted as outputs to Table 2 (90), in step 95. However, if at least one of the values entered in step 92 is not permissible for being greater than its corresponding maximum allowable K-value from step 93, new maximum desirable K-values need to be entered and the process should restart from step 92.

In FIG. 23, Table 3 (100) consists of several Sub-tables (100*a-h*), one for each Layer-Type (A to H). These Layer-Types are, for this embodiment: Gypsum Boards (A), Insulating Layers (B), Vapor Barriers (C), SIPs (D), OSB Boards (E) Wood Floors (F), Wall Air Chambers (G) and Floor or Roof Air Chambers (H). For other embodiments the Layer-Types may vary and so may the information to be recollected for each of them. Each Sub-table has the following columns:

"Option", indicated by an integer number, is a number designating which one of the options for the current Layer-Type the corresponding row will define. Each option will be defined by a numeral starting with "1" and the number of options for each Layer-Type will vary in function of the number of options that the user has availability of and wants to consider for the methods.

"Th", is the thickness of the Layer for the corresponding option (measured in m)

"λ", is the thermal conductivity of the Layer for the corresponding option (measured in W/mk)

"δ", is the vapor permeability of the Layer for the corresponding option (measured in g/m h kpa)

"$", is the price in dollars (per square meter) for the corresponding option.

These values may be obtained from commercial catalogs, general technical information about the materials, official standards, online resources etc. Any equivalents or variations of the parameters considered for each Layer-Type may be used as long as their inclusion does not alter the general results of the Calculation Methods.

In a simple version of the Calculation Methods, one single variety for each Layer-Type may be considered. In that case, only the thickness needs to be modified for the Calculation Methods, the other variables remaining constant for all options, and associated to the physical properties of the material(s) in question. This simplified scenario allows the elimination of the integer constraints of FIG. 28's step 129. Instead, the constraints used here should be the maximum and minimum thicknesses allowed for each layer, and the variable cells for this simplified case may be the thickness cells instead of the option cells. In cases like this, linear programming such as the Simplex Algorithm and software such as Lindo may be used for the Optimization Method. Some embodiments may include a mixture of simplified options where only the thickness is variable with options where the other variables acquire different values as well. Other more complex embodiments, on the other hand, may involve additional variables such as densities, qualities, commercial brands, varieties, etc.

Figure 24:
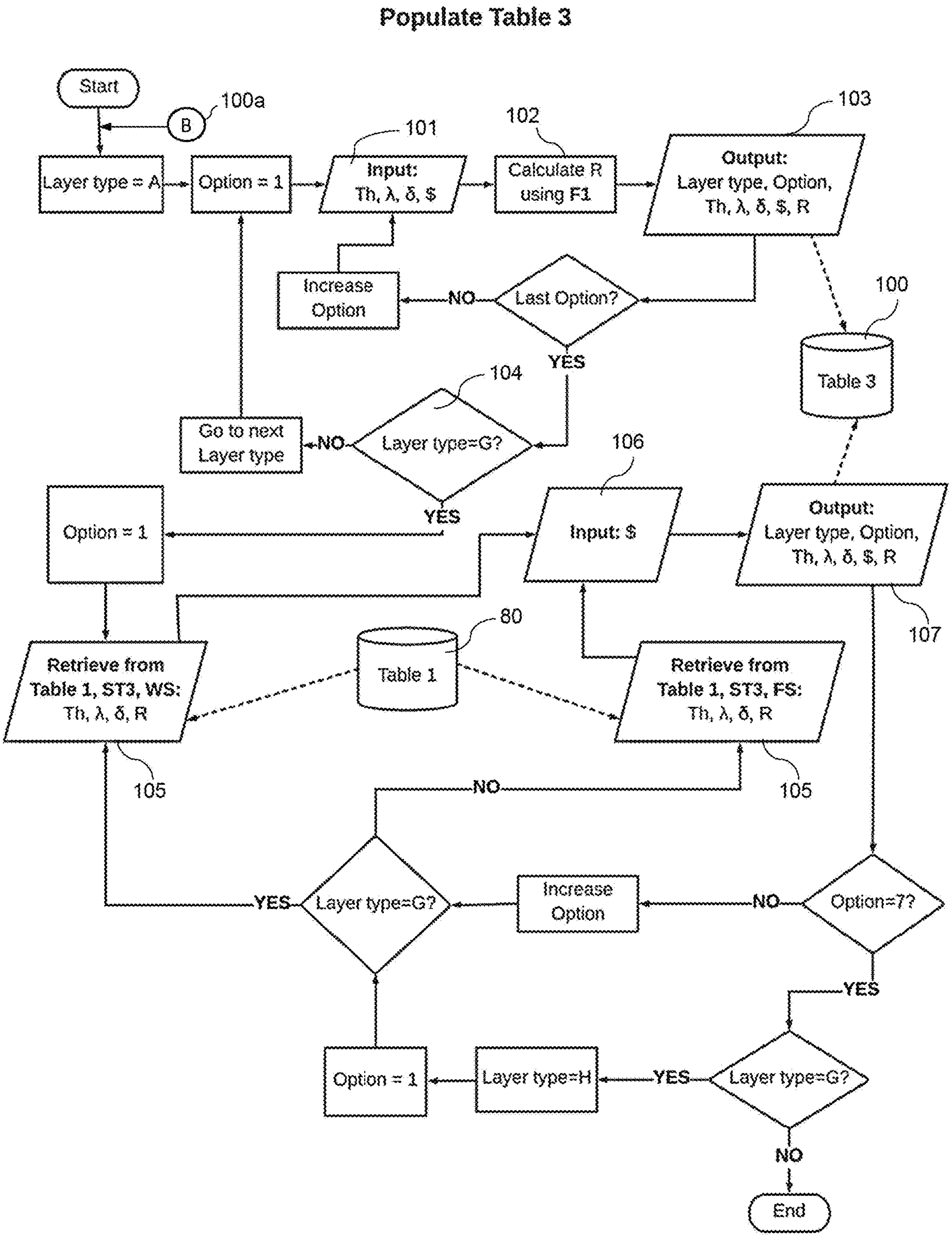
FIG. 24 is a flow chart showing the steps for populating Table three in an illustrative embodiment of the Calculation Methods in accordance with the present invention.

FIG. 24 illustrates a possible process in which the values of the variables of Table 3 (100) could be entered by the User. For each option of each Layer-Type, Th, λ, δ and $ are entered in step 101, for example by typing the values directly in the corresponding cells, as in the case of an excel file, or entering them through an online or offline form, dialogue box, importing them from a catalog or file, etc. The thermal resistance of each option of each Layer-Type, "R", (measured in m2k/w), is then calculated using F1 in step 102. F1 is the first of the formulas included in FIG. 29, suggested for their use in these Calculation Methods, although other formulas or approximation methods may be used for obtaining equivalent results.

$$F1: \mid R = Th/\lambda$$

This simply means that R for an option is obtained by dividing the thickness for that option by the thermal conductivity for that same option. In the case R is provided in the catalogs, of course, it does not need to be calculated, and the thermal conductivity may need to be calculated instead in some cases. The values of all the variables entered in steps 101 and 102 are submitted as outputs to Table 3 (100), in step 103. The same process is done for every option of every Layer-Type until reaching Layer-Type G in step 104. Layer-Type G is an air chamber. The information of air chambers is stored in Sub-table 3 (83) of Table 1 (80). This information for air chambers G and H is retrieved from said sub-table in step 105. Step 106 adds the cost of creating an air chamber of for the thickness of each option. This piece of information should be added considering the materials such as additional beams and columns that will be needed to create an air chamber of those characteristics. All the information relating to prices, like this one, will only be needed for the methods involving the minimization of costs, while other methods like the K-Max Method or the No-Condensation Method may eventually ignore them. The values of all the variables entered in the applicable iterations of steps 105 and 106 are submitted as outputs to Table 3, in step 107.

In FIG. 25, Table 4 (110) has the following columns:

Column 110*a*, "Layer-Type", is a letter, or letters representing the type of Layer the row designates together with a description of the concept for each Layer-Type. The Layer-Types should be presented for each Envelope-Section 111*a* in the actual order of arrangement the Envelope-Layers would have in the building, from innermost to outermost and including the ISR and the ESR for each Envelope-Section.

Column 110*b*, "Layer Number" indicated by an integer number, is a number designating which one of the Layers for the current Envelope-Section the corresponding row will define, indicating also the order of arrangement of the Layers of each Envelope-Section from innermost to outermost.

Column 110*c*, "Th", is the thickness of the Layer (measured in m)

Column 110*d*, "λ", is the thermal conductivity of the Layer (measured in W/mk)

Column 110$e$, "R", is the thermal resistance of the Layer (measured in m2k/w)

Column 110$f$, "K", is the K-value of the Layer (measured in W/m2 K)

Column 110$g$, "t", is the temperature of the interior surface of the Layer (measured in ° C.)

Column 110$h$, "δ"; is the vapor permeability of the Layer (measured in g/m h kpa)

Column 110$i$, "Pv" is the vapor pressure of the Layer (measured in kpa)

Column 110$j$, "Td" is the dew point temperature at the interior surface of the Layer (measured in ° C.)

Column 110$k$, "Δt" is the difference between the temperature of and the dew point temperature at the interior surface of the Layer (t minus Td)

Column 110$l$, "$" is the price in dollars (per square meter) for the corresponding option of the current Layer.

Column 110$m$, "KMC" is a binary variable acquiring the value of "1" when the "K-max Condition" is satisfied for the Layer and the value of "0" when it is not satisfied.

Column 110$n$, "NCC" is a binary variable acquiring the value of "1" when the "No-Condensation Condition" is satisfied for the Layer and the value of "0" when it is not satisfied.

Column 110$o$, "Option", indicated by an integer number, is a number designating which one of the options available for the current Layer-Type in Table 3 (100) applies for the current Layer. The desired option may be entered manually by the user or automatically tried by the optimizer process or other automation processes. The information in this table should be tied to the information on Table 3 in such a way that if this option is changed (for example selected from a drop-down menu) the values of the corresponding columns for that row are updated to reflect the contents of Table 3 for the selected option (for example, through the use of the VLOOKUP function in excel).

The cell 111$b$ is the total K-value of the Building Envelope, calculated as the sum of all the K-values in column 110$f$. This is the cell that will be minimized if the Min-K-Value version of the Optimization Method.

The cell 111$d$ is the total cost of the Building Envelope, calculated as the sum of all the prices in column 110$l$. This is the cell that will be minimized if the Min-Cost version of the Optimization Method.

The content of several cells in the table of this example (some pointed with 111$c$) refer to formulas (F2, F5, F6, etc.) which are the formulas of FIG. 29 suggested to be used for the calculation of the values of these variables in function of the values of the other variables that, as the table indicates, are obtained from the other tables. For example, "f/Table 1" means that the value for that cell is obtained from Table 1 (80). 111$e$ are binary variables acquiring the value of "1" when the "No-Condensation Condition" or when the "K-max Condition" (depending on the column) are satisfied for all the Layers of an Envelope-Section and the value of "0" when said Condition is not satisfied for at least one of them. All of these values should be "1" for the K-max Condition and the No-Condensation Condition of the home or building to be satisfied.

In this embodiment, the Layer Types of column 110$a$ for each Envelope Section, including their order of arrangement, are manually selected by the User. However, in other embodiments, this selection may be automated and included in the Optimization Method, subject to certain restrictions to be defined by the User. In this case, the Optimization Method would not only select the options of the Layers (in a fixed order of arrangement defined by the User) that satisfy all the constraints and optimize the selected goal, but it would further define the optimal Layer Types, quantity of each, and order of arrangement that satisfy all the constraints and optimize the selected goal, subject to the restrictions defined by the User. This would throw as a result an even more effective configuration of the Envelope Layers due to the consideration of a significantly larger set of alternatives.

Figure 26:
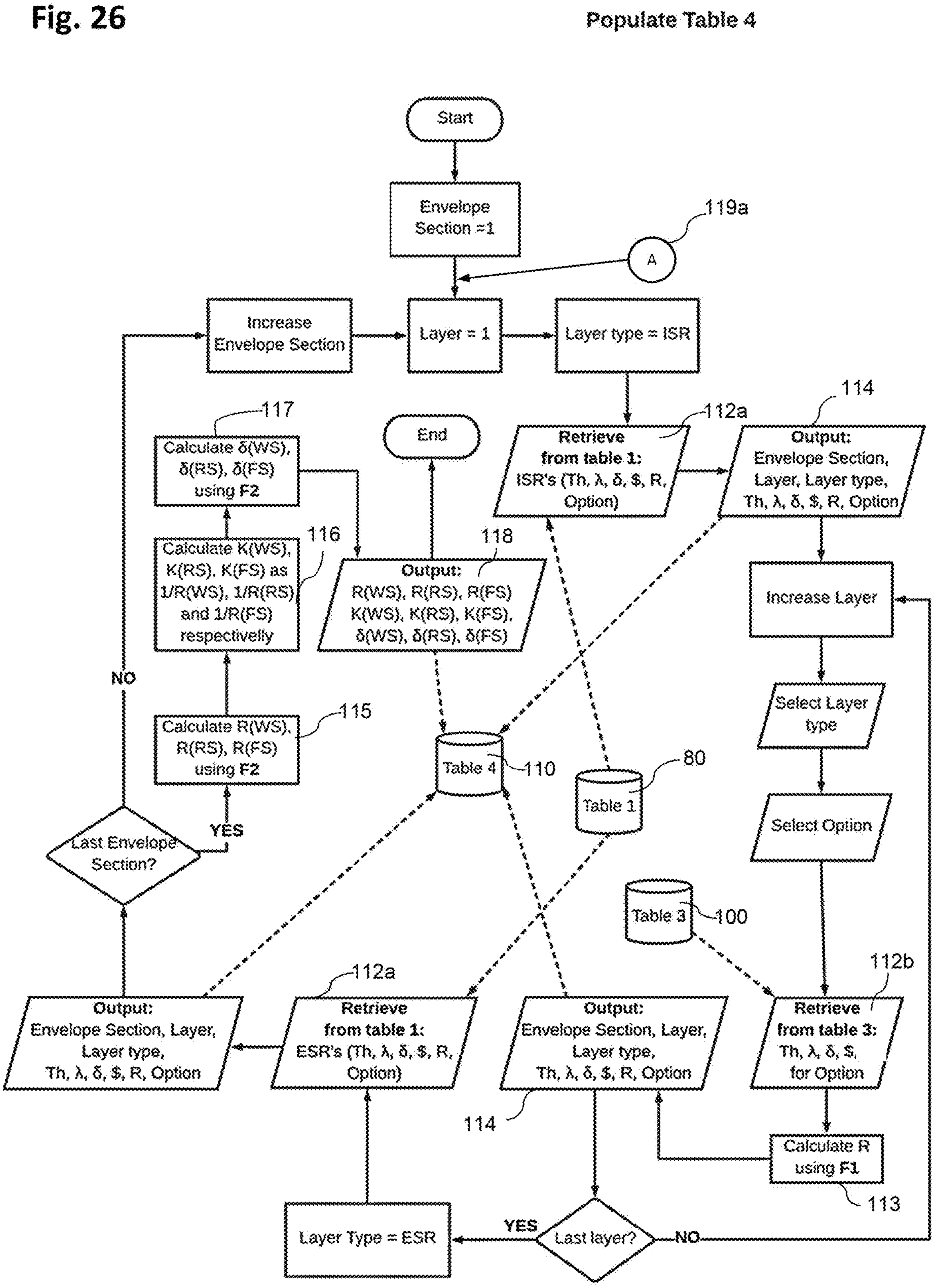
FIG. 26 is a flow chart showing the steps for populating Table four in an illustrative embodiment of the Calculation Methods in accordance with the present invention.

FIG. 26 explains in more detail how the values for Table 4 (110) are obtained. The values for columns 110$c$, 110$d$, 110$e$, 110$h$, 1001 and 110$o$ for the ISR and ESR Layers of each Envelope-Section are retrieved from Table 1 (80) in step 112$a$. Then, for the other Layers of each Envelope-Section, the values forthe same columns are retrieved from Table 3 (100) in step 112$b$, with the exception of "R" (column 110$e$) which is calculated using F1 in step 113, and the values of all the variables entered in the previous steps are submitted as outputs to Table 4, in step 114. After completing these values for all the Layers of all the Envelope-Sections, the total values of R for each Envelope-Sections are calculated in step 115 by using the F2 formula of FIG. 29:

$$F2: | X_{section} = \sum_{l=1}^{n} X$$

This means that all the values of a variable (in this case "R") for all the Layers of an Envelope-Layer are added up to calculate the totals of that variable for the Envelope-Layer. These values are stored in the three bottom rows (Marked as "Totals") of the corresponding column of Table 4 (110) in FIG. 23. In step 116 of FIG. 24, the values for the three bottom rows (Marked as "Totals") of Column 110$f$ of FIG. 23 (corresponding to the total K-values of each Envelope-Section) are obtained by calculating the inverse of the total values of R just obtained in step 115 (1/Total R, for each Envelope-Section). The total values of δ, for each Envelope-Sections are then calculated in step 117, also by using the F2 formula of FIG. 29, this time applied to δ (column 110$h$ of FIG. 23). These values are submitted as outputs to Table 4 in step 118. The rest of the cells of Table 4 in FIG. 25 will be calculated when applying the No-Condensation Method, explained in FIG. 27 and the K-Max Method, explained in FIG. 28.

No-Condensation Method

Figure 27:
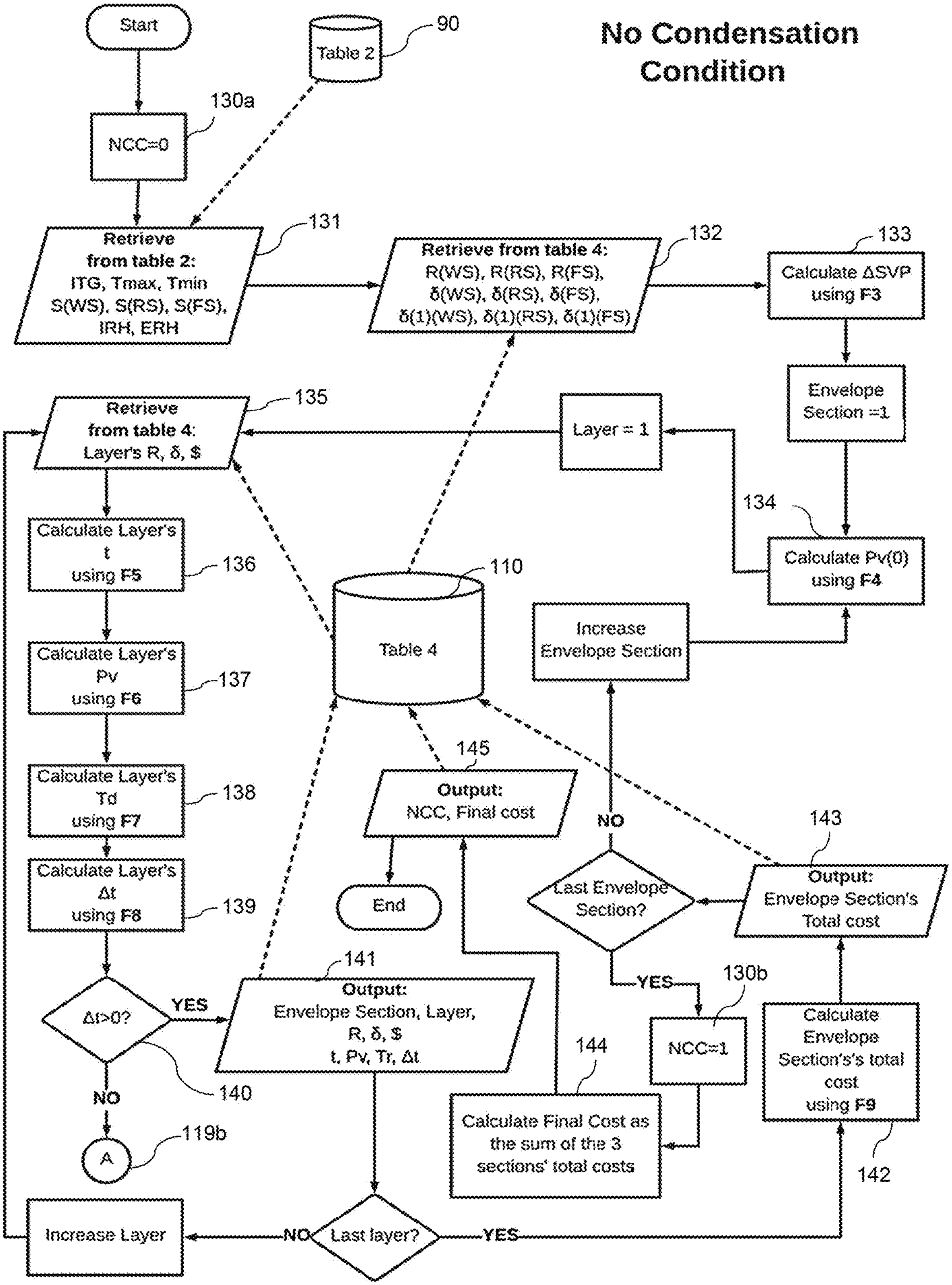
FIG. 27 is a flow chart showing the steps for calculating the No-Condensation Condition in an illustrative embodiment of the No-Condensation Method in accordance with the present invention.

The No-Condensation Method has as its main goal the verification of the absence of any substantial risks of Interstitial and/or Superficial condensation of water in a Building Envelope comprising Envelope-Layers as defined by this specification. For doing this, the both the temperature (t) and the dew point temperature (Td) of the interior surface of each Layer for each Envelope-Section are calculated and compared in such a way that the "Δt"(the difference between the temperature and the dew point temperature, t minus Td) for every Layer is positive, meaning that there are no significant risks of superficial or interstitial condensation. FIG. 27 shows an embodiment of a method in which the No-Condensation Condition may be verified. However, other embodiments may include substantial variations in the way of performing such verification. For example, a psychrometric diagram may be used instead of the proposed equations. In FIG. 27, the binary variable "NCC" has an initial value of "0" in step 130$a$, meaning that the No-Condensation Condition is still not verified.

The values of ITG, Tmax, Tmin, S(WS), S(RS), S(FS), IRH and ERH are retrieved from Table 2 (90) in step 131, and the values of R(WS), R(RS), R(FS), δ(WS), δ(RS), δ(FS), and δ(1) for every Envelope-Section are retrieved from Table 4 (110) in step 132, where δ(1) is just the value of δ for the first Layer of each Envelope-Section. ΔSVP is the calculated in step 133 by using the F3 formula from FIG. 31:

$$F3: \mid \Delta SVP = \frac{\left(6.11 \cdot \frac{\exp\left(\frac{(17.27 \cdot ITG)}{(237.3 + ITG)}\right)}{10}\right) IRH}{100} - \frac{\left(6.11 \cdot \frac{\exp\left(\frac{(17.27 \cdot Tmin)}{(237.3 + Tmin)}\right)}{10}\right) ERH}{100}.$$

In this formula, SVP stands for Saturated Vapor Pressure and OSVP is the difference between the Interior SVP (first term of the F3 formula) and the Exterior SVP (second term of the F3 formula). The IRH and ERH used for this calculation are retrieved from Table 2 (90).

Then, for every Layer of every Envelope-Section, Pv (0) of the Envelope-Section is calculated in step 134 by using the F4 formula from FIG. 31:

$$F4: \mid PV_0 = \frac{\left(6.11 \cdot \frac{\exp\left(\frac{(17.27 \cdot ITG)}{(237.3 + ITG)}\right)}{10}\right) IRH}{100} - \Delta SVP \cdot \frac{\delta_1}{\delta_{section}}$$

Pv (0) is the initial vapor pressure for each Envelope-Section which may be obtained by subtracting ΔSVP times the vapor permeability of the First Layer of the Envelope-Layer divided by the total vapor permeability of the Envelope-Section, to the Interior Saturated Vapor Pressure. Subsequently, the R, δ and $ of each Layer (corresponding to the manually or automatically selected option for the Layer) are retrieved from Table 4 (110) in step 135. The Layer's temperature is then calculated in step 136 using the F5 formula from FIG. 31:

$$F5: \mid T_n = \left\{ ITG - \frac{R_n(Tmax - Tmin)}{R_{section}} : n = 1,\ T_{n-1} - \frac{R_n(Tmax - Tmin)}{R_{section}} : n > 1 \right\}$$

This formula is bifurcated in two different situations: When n=1 (that is, for the first Layer of each Envelope-Section) the temperature is obtained by calculating a "temperature variation term" consisting of the R (for that Layer) times the difference between Tmax and Tmin, both obtained from Table 2 (90), divided by the total R of the corresponding Envelope-Section, and subtracting this "temperature variation term" from the ITG. However, when n>1, that is, for all the other Layers of each Envelope-Section, not being the first one, the temperature is calculated by subtracting said "temperature variation term" to the temperature of the previous Layer.

In the next step (step 137) the vapor pressure for each Layer is calculated by using the F6 formula from FIG. 31:

$$F6: \mid PV_n = PV_{n-1} - \Delta SPV \cdot \frac{\delta_n}{\delta_{section}}.$$

In this formula, the ΔSVP times the vapor permeability of the Layer divided by the total vapor permeability of the corresponding Envelope-Section is subtracted from the vapor pressure of the previous Layer to obtain the vapor pressure of the current Layer. It is important to remember that the vapor pressure for the first Layer of the Envelope-Section had already been calculated in step 134. In step 138 the dew point temperature of the Layer is calculated, using the F7 formula of FIG. 29:

$$F7: \left| \begin{array}{l} T_d = C1 \cdot (Pv \cdot 10 - 3)C2 + C3 \ln(Pv \cdot 10 - 3) + C4 \\ \text{where :} \\ \begin{pmatrix} C1 \\ C2 \\ C3 \\ C4 \end{pmatrix} = \begin{pmatrix} 82.45 \\ 0.12 \\ 3.06 \\ 196.81 \end{pmatrix} : 0.16\,Pa < Pv < 610.74\,Pa, \text{ and} \\ \begin{pmatrix} C1 \\ C2 \\ C3 \\ C4 \end{pmatrix} = \begin{pmatrix} 33.38 \\ 0.22 \\ 7.16 \\ 246.76 \end{pmatrix} : 610.74\,Pa < Pv < 101340\,Pa \end{array} \right.$$

F7 uses four variables, C1, C2, C3 and C4, which can take different values depending of the range of Vapor Pressure applying to the case. This formula is well known in the art and any equivalent thereof or any good approximation method may also be used for the calculation of the dew point temperature at each Layer. As previously stated, this can as well be observed in a psychrometric diagram. The Layer's Δt is finally calculated in step 139 by using the F8 formula of FIG. 31, that is, simply subtracting the td of the Layer from the t of the Layer.

$$F8: \mid \Delta T = t - td$$

If this difference is greater than zero, that means, if the temperature of the Layer is greater than the dew point temperature at the Layer, as checked in step 140, it means that there are no significant risks of condensation for that particular Layer. If this is the case, all the relevant variables for that Layer are submitted as output to Table 4 (110), in step 141 and the process is repeated, from step 135, for every Layer of the Envelope-Section. If Δt for a Layer is 0 or less than 0, this means that there are unacceptable risks of water condensation in that Layer and therefore the current selection of options for that Envelope-Section is not acceptable. If this happens, step 119*b* refers to a connector "A" which at its time refers to the connector "A" 119*a* of FIG. 26. This means that in the case that the No-Condensation Condition is not satisfied for an Envelope-Section, the whole process of FIG. 26 for that Envelope-Section needs to be repeated starting from step 119*a*, and selecting a different option, having a higher vapor permeability, for the Layer that caused the problem, and/or making other modifications, either manually or automatically, tending to solve the identified problem. Once this is done, the process of FIG. 27 should be repeated, until finding a solution that satisfies the Condition Δt>0 for all the Layers of the Envelope-Section. Once this happens, the total cost of the Envelope-Section is calculated in step 142 by using the F9 formula of FIG. 31 and the results submitted as outputs to Table 4 in step 143.

$$F9: \mid \text{Section's Total Cost} = \sum_{l=1}^{n} \$_l \cdot S_{section}$$

According to this formula, the total cost on the Envelope-Section may be calculated by adding all the individual costs by square meter of each Layer and multiplying them by the corresponding square meters of surface of the section. Obviously, prices may be available by unit or by other measures and other methods for the calculation of the total cost of the Envelope-Section may also be used.

The process is repeated from step 134 for the remaining Envelope-Sections, until the Condition Δt>0 is satisfied for all the Layers of all the Envelope-Sections.

When this happens the No-Condensation Condition for the building is satisfied. NCC acquires the value of "1" in step 130*b* to reflect it, the final cost of the Envelope-Section is calculated by adding up the total costs of each of the Envelope-Sections in step 144, and all the relevant variables, including the total Envelope cost and the information that NCC is met, are submitted as outputs to Table 4 in step 145. To the total cost of the Building Envelope calculated in step 144, other costs of the building may be added, including the cost of labor, the cost of the solar energy generator and any other costs associated to the construction and set up of the Zero-Energy home or building. Thus, a more complete information would be available for decision making and, when using the optimization method, the total cost may be minimized instead of the cost of just the Building Envelope. The Zero-Energy goal may be reached through different combinations of Building Envelope options and renewable energy generation systems, If the Optimization Method takes into account these alternatives it may help the User find the most overall cost-efficient way of achieving this goal.

K-Max Method

Figure 28:
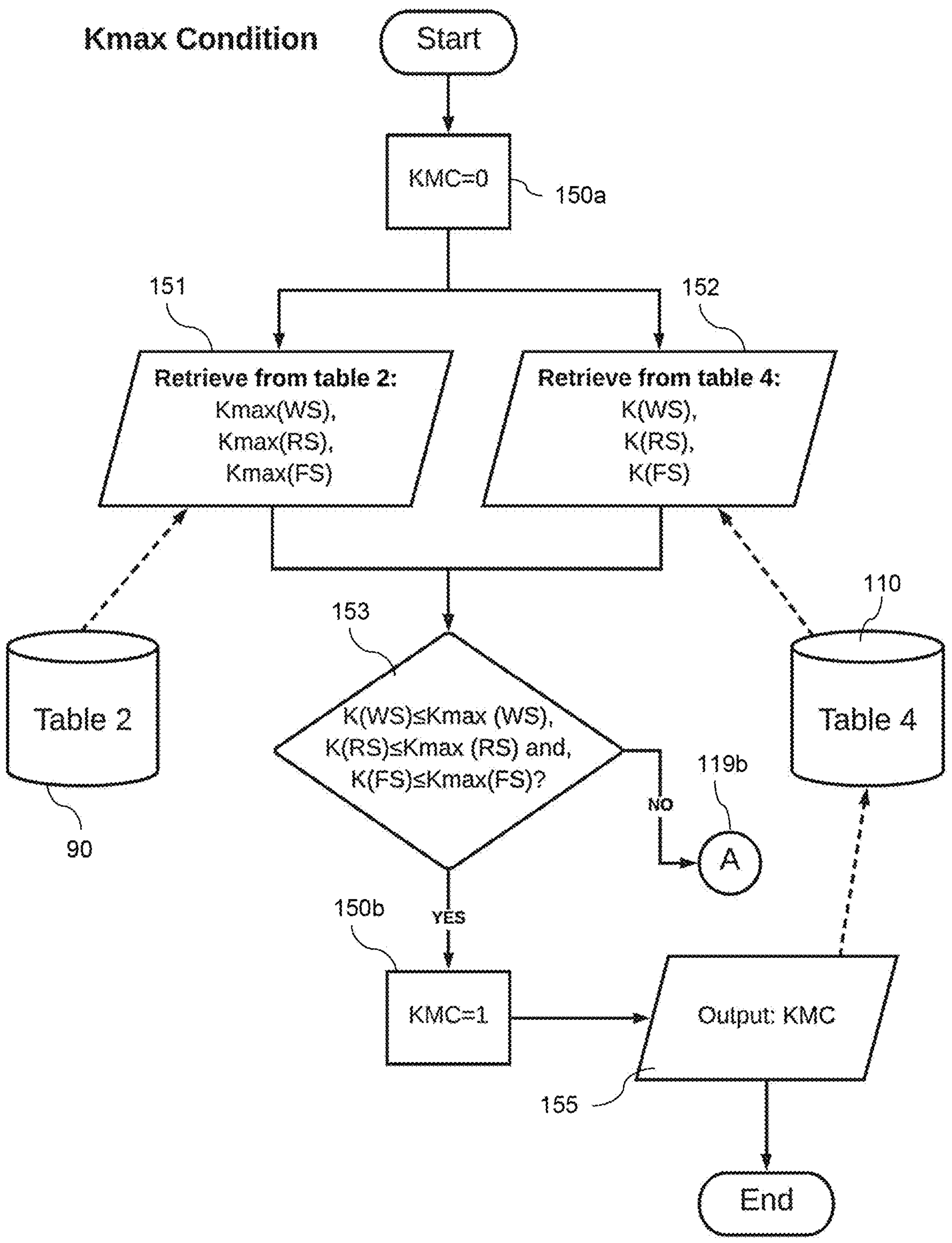
FIG. 28 is a flow chart showing the steps for calculating the K-Max Condition in an illustrative embodiment of the K-Max Method in accordance with the present invention.

The K-Max Method has as its main goal the verification that the total K-value of every Envelope-Section of a building is less than or equal to the maximum K-Value allowed for that Envelope-Section. FIG. 28 shows an embodiment of a method in which the K-Max Condition may be verified. However, other embodiments may include substantial variations in the way of performing such verification. In FIG. 28, the binary variable "KMC" has an initial value of "0" in step 150*a*, meaning that the K-Max Condition is still not verified. In step 151, the Kmax for each Envelope-Section is retrieved from Table 2 (90). It is important to recall that these K-values cannot be higher than the Kmax values corresponding to Tmin or to Tmax in Table 1 (80) (except for the admitted 20% tolerance). The calculated K-values for each Envelope-Section are retrieved in step 152 from the totals for each Envelope Section of Column 110*f* of Table 4 (110) in FIG. 25. Step 153 compares these values. The calculated K-values from step 152 should be less than or equal to the Kmax values from step 151, for all Envelope-Sections. If they are not, that means if the calculated K-value of an Envelope-Section is greater than the maximum permissible K-value for that section, step 119*b* refers to a connector "A" which at its time refers to the connector "A" 119*a* of FIG. 26. This means that in, the case that the K-Max Condition is not satisfied for an Envelope-Section, the whole process of FIG. 26 for that Envelope-Section needs to be repeated starting from step 119*a*, and selecting a different options, having a higher R, for one or more of the Layers of the Envelope-Section that caused the problem, and/or making other modifications, either manually or automatically, tending to solve the identified problem. Once this is done, the process of FIG. 28 should be repeated, until finding a solution that satisfies the Condition 153 for all Envelope-Sections. When this happens the K-Max Condition for the building is satisfied, KMC acquires the value of "1" in step 150*b* to reflect it, and the information that KMC is satisfied is submitted as output to Table 4 (110) in step 155.

Optimization Method

The Optimization Method has as its main goal finding those options for the Envelope-Layers of a Zero-Energy home or building as per this specification that satisfy both the K-Max Condition and the No-Condensation Condition and, at the same time, minimize the total cost of the Envelope, the total overall cost of the building, the total K-value of the Building Envelope or any other relevant variables that the User wishes to minimize or maximize while maintaining both Conditions satisfied.

Figure 30:
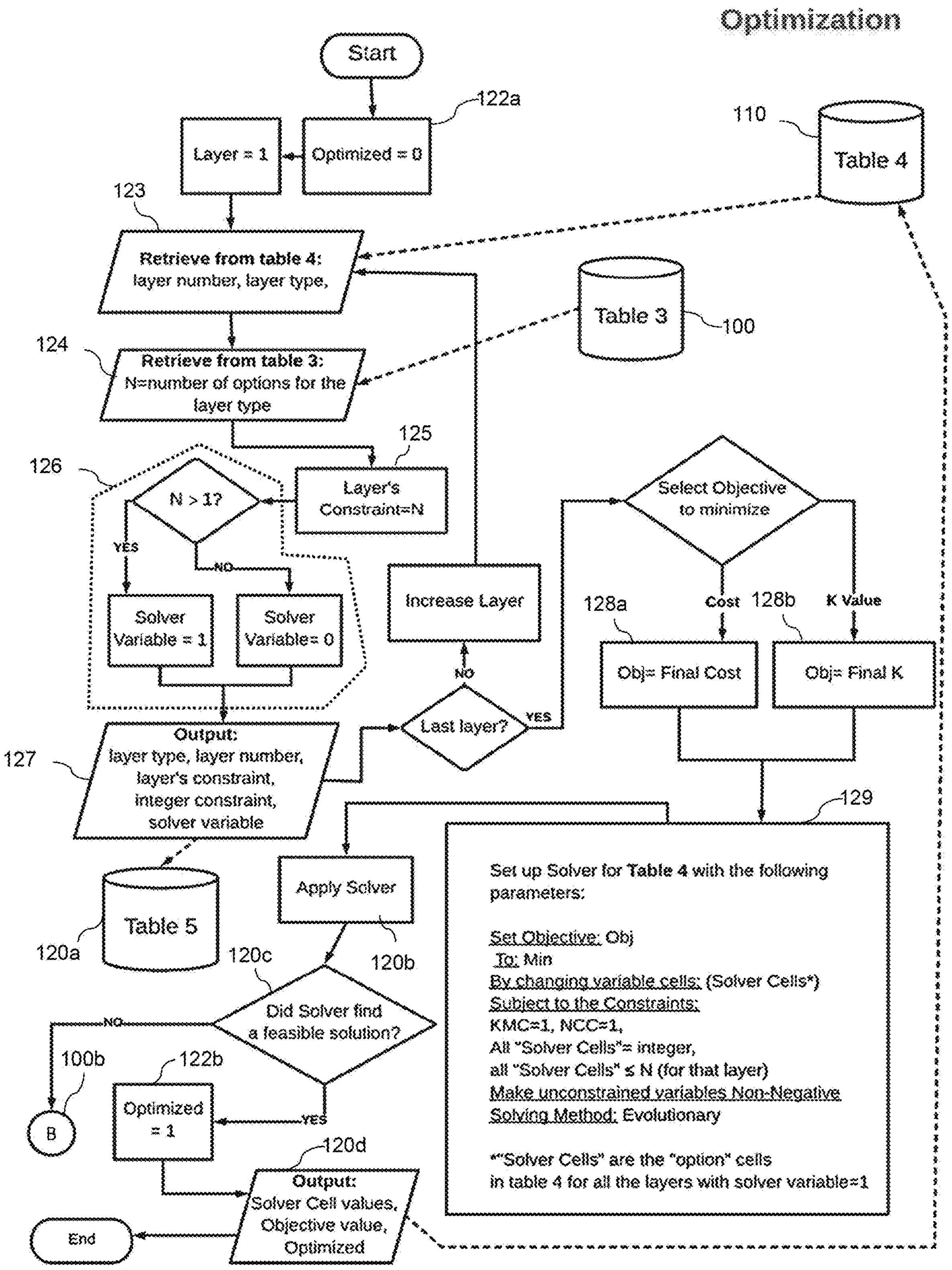
FIG. 30 is a flow chart showing the steps for the minimization of the K-value or the Final Cost of the Envelope in an illustrative embodiment of the Optimization Method in accordance with the present invention.

FIG. 29 shows a table (Table 5, 120*a*) and FIG. 30 shows a process (Optimization Process 120*b*) for a possible embodiment of the method in which the optimization may be performed. This embodiment uses Excel Solver to achieve this goal. However, other embodiments may include substantial variations in the way of performing such optimization, for example through the use of custom programing, other optimization software or even manual procedures of linear or non-linear programming and operations research.

In FIG. 29, Table 5 (120*a*) has the following columns:

Column 110*a*, "Layer-Type", is a letter, or letters representing the Type of Layer the row designates together with a description of the concept for each Layer-Type. The values of 110*a* for this table are the same values of 110*a* for Table 4 (110) of FIG. 25.

Column 110*b*, "Layer Number" indicated by an integer number, is a number designating which one of the Layers for the current Envelope-Section the corresponding row will define, indicating also the order of arrangement of the Layers of each Envelope-Section from innermost to outermost. The values of 110*b* for this table are the same values of 110*b* for Table 4 (110) of FIG. 25.

Column 121*a*, "Layer's Constraint", indicated by an integer number, is a number indicating how many options are there on Table 3 (100) for the corresponding Layer-Type.

Column 121*b*, "Solver variable", is a binary variable acquiring the value of "1" when the number of options stated in Column 121*a* is greater than 1 (that is, if there are at least two options for the Layer) and the value of "0" when the Layer does not have any options to choose from (and, therefore, the value of 121*a* is "1")

The values for these variables shown in the table are only examples of values that could reasonably be entered by the User in a possible embodiment, for illustrative purposes.

In FIG. 30, the binary variable "Optimized" has an initial value of "0" in step 122*a*, meaning that the optimization has not yet been achieved. For every Layer of every Envelope-Section, the Layer number and Layer-Type are retrieved from Table 4 (110) in step 123, and the number of options for the Layer-Type is retrieved form Table 3 (100) instep 124. In step 125, a variable "N" acquires the value of the quantity of options just obtained in step 124, and this value will represent the Layer's Constraint that will be stored in the corresponding row of Column 121*a* of Table 5 (120*a*) of FIG. 29. The subprocess 126 assigns the value of "1" to the Solver Variable of column 121*b* of Table 5 when N>1 (when there are at least two options for that Layer) and the value of "0" when there are no options to choose from. In step 127, all the relevant variables submitted as output to Table 5. The same process is repeated for every Layer of every Envelope-Section. Once it's done, the objective to minimize should be selected. Step 128*a* selects to minimize the final cost of the Envelope-Section, which corresponds to cell 111*d* of Table 4 in FIG. 25, while Step 128*b* selects to minimize the final K-value of the Envelope-Section, which corresponds to cell 111*b* of Table 4 in FIG. 25. Step 129 then specifies all the parameters to be used to set up Excel Solver to optimize the results. Other solver software may use the same, similar, or different parameters for their setup. In this case, Solver is applied to Table 4, which at the same time is "tied" to all the other tables being updated every time the corresponding information in the other tables is updated and vice-versa. The objective cell to enter at the dialog box of the Solver is the cell selected in step 128, a or b (111*d* or 111*b*, respectively). "Min" is chosen because the selected cell should be minimized. In the field "By changing the variable cells" all the cells of the column 110*o* of Table 4 for those rows in which the value of the solver variable of column 121*b* of Table 5 is "1" shall be selected. This means that the variables that the solver needs to modify are those which have different options to choose from, in Table 3. The constraints are then set up, so that all the values of the 111*e* cells of Table 4 are "1" (which means that both the K-Max Condition and the No-Condensation Condition are satisfied for that solution), an "integer" constraint is added for every one of the variable cells, and another constraint is added for every one of the variable cells defining a maximum value of N for it, where N is the number of options available for that Layer-Type in Table 3, number which may be obtained from column 121*a* of Table 5 in FIG. 29. Finally, the "Make unconstrained variables non-Negative checkbox is checked and the "Evolutionary" solving method is selected.

With these parameters, Solver is applied in step 120*b*. If Solver finds a feasible solution in step 120*c*, then the "Optimized" variable acquires the value of "1" in step 122*b* to reflect it, and the information that the optimization has been achieved, together with all the relevant variables, are submitted as outputs to Table 4 (110) in step 120*d*.

If Solver does not find a feasible solution in step 120*c*, then step 100*b* refers to a connector "B" which at its time refers to the connector "B" 100*a* of FIG. 25. This means that in the case that there are no optimal solutions, the No-Condensation Condition, the K-Max Condition, or both are not satisfied by any possible combination of Layer options. If this happens, the design of the Envelope (the quantity and order of arrangement of the Layers) should be modified, more or better options for some or all of the Layer-Types should be added to Table 3 (100), and/or any other modifications tending to solve the identified problem should be applied, after which the whole processes of FIGS. 22, 24, 25 and 26 need to be repeated starting from step 100*a* in FIG. 24. Once this is done, the process of FIG. 30 should be repeated, until Solver finds a feasible solution.

FIG. 32 depicts an example of spreadsheet used for setting up a possible structure of Table four in an illustrative embodiment of the Calculation Methods in accordance with the present invention, comparing the opaque envelope with a similar envelope using a thermal bridge breakage capsules. In both sub tables, the Layer Number 110*b*, as well as the Layer-Types should be presented for each Envelope-Section 111*a* in the actual order of arrangement the Envelope-Layers would have in the building, from outermost to innermost and including the ESR and the ISR. The thickness 110*c* thermal conductivity 110*d* and the thermal resistance 110*e* of the layers are shown. But in the second sub table a Polyurethane Sandwich Panel with rupture capsule is considered, while in the first one it is omitted. As a result, the Kso (Thermal transmittance of the opaque surface design without thermal bridge) 111*b*(1) of the first sub table has a lower result than the Kpt (Thermal bridge thermal transmittance) 111*b*(2) of the second sub table, showing that the use of the Thermal Bridge Breakage capsule 160 improves the thermal efficiency of the envelope. This improvement is calculated by dividing the Kpt 111*b*(2) by the Kso 111*b* (1), thus obtaining the Relation Kpt/Kso 162. In this example, the proposed relation is verified, since the value of the thermal transmittance of the thermal bridge Kpt is up to 25% higher than the thermal transmittance of the analyzed envelope design.

The description as set forth is not intended to be exhaustive or to limit the invention to the precise form disclosed. Many modifications and variations are possible in light of the teachings above without departing from the spirit and scope of the forthcoming claims.

What is claimed and desired to be secured by Patent is as follows:

1. A Thermal Bridge Breakage capsule comprising a hemispherical cap filled with polyurethane foam, said hemispherical cap made of PVC material and having a hole and a flat plaque around the hemispherical cap to fix the Thermal Bridge Breakage capsule to an energy-efficient Building Envelope with glue, wherein a property of the Thermal Bridge Breakage Capsule is that an arrangement of a plurality of the Thermal Bridge Breakage capsules in Intervening-Layers of an energy-efficient Building Envelope for a Zero-Energy building, the arrangement separating each of the plurality of the Thermal Bridge Breakage capsules by a distance "L" of between 0.60 m and 1.40 m from the others of the plurality of the Thermal Bridge Breaking capsules in all envelope sections, provides a K-value ratio of a K-value of the Building Envelope with said Thermal Bridge Breakage capsules divided by a K-value of said Building Envelope without said Thermal Bridge Breakage capsules that is equal to or less than 1.12.

* * * * *